United States Patent
Dabbous et al.

(10) Patent No.: US 10,927,253 B2
(45) Date of Patent: Feb. 23, 2021

(54) NUCLEATING AGENT FOR COMPACT THERMOPLASTIC POLYURETHANES

(71) Applicant: BASF SE, Ludwigshafen am Rhein (DE)

(72) Inventors: Raphael Dabbous, Kaisten (CH); Elmar Poeselt, Lemfoerde (DE); Birte Lahrmann, Lemfoerde (DE); Guido Bilges, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/078,070

(22) PCT Filed: Feb. 22, 2017

(86) PCT No.: PCT/EP2017/053997
§ 371 (c)(1),
(2) Date: Aug. 21, 2018

(87) PCT Pub. No.: WO2017/144502
PCT Pub. Date: Aug. 31, 2017

(65) Prior Publication Data
US 2019/0300705 A1    Oct. 3, 2019

(30) Foreign Application Priority Data

Feb. 22, 2016 (EP) .................................... 16156697

(51) Int. Cl.
| | | |
|---|---|---|
| C08L 75/04 | (2006.01) | |
| C08G 18/32 | (2006.01) | |
| C08G 18/42 | (2006.01) | |
| C08G 18/48 | (2006.01) | |
| C08G 18/66 | (2006.01) | |
| C08G 18/73 | (2006.01) | |
| C08G 18/76 | (2006.01) | |
| C08J 3/20 | (2006.01) | |

(Continued)

(52) U.S. Cl.
CPC .............. *C08L 75/04* (2013.01); *C08G 18/06* (2013.01); *C08G 18/3206* (2013.01); *C08G 18/3215* (2013.01); *C08G 18/4238* (2013.01); *C08G 18/4277* (2013.01); *C08G 18/4808* (2013.01); *C08G 18/4825* (2013.01); *C08G 18/4854* (2013.01); *C08G 18/664* (2013.01); *C08G 18/6674* (2013.01); *C08G 18/6681* (2013.01); *C08G 18/73* (2013.01); *C08G 18/758* (2013.01); *C08G 18/7671* (2013.01); *C08G 18/7678* (2013.01); *C08J 3/201* (2013.01); *C08K 3/105* (2018.01); *C08K 5/16* (2013.01); *C08K 5/18* (2013.01); *C08K 5/34* (2013.01); *C08K 5/3412* (2013.01); *C08K 5/3415* (2013.01); *C08K 5/3417* (2013.01); *C08K 5/3437* (2013.01); *C08L 75/06* (2013.01); *C08L 75/08* (2013.01); *C08L 2205/24* (2013.01)

(58) Field of Classification Search
CPC .. C08L 75/04; C08K 5/34; C08K 5/16; C08K 5/3412; C08K 5/18; C08K 5/3415; C08G 18/06
See application file for complete search history.

(56) References Cited

U.S. PATENT DOCUMENTS

| | | | |
|---|---|---|---|
| 4,618,667 A | 10/1986 | Kay et al. | |
| 5,237,000 A * | 8/1993 | Lausberg | ................ C08L 75/04 525/440.12 |

(Continued)

FOREIGN PATENT DOCUMENTS

| | | |
|---|---|---|
| CN | 102125704 A | 7/2011 |
| CN | 105218838 A | 1/2016 |

(Continued)

OTHER PUBLICATIONS

Szycher, M.; Szycher's Handbook of Polyurethanes, 2013, p. 523-585 and p. 873-896.*
Broda, J.; Journal of Applied Polymer Science, 2003, vol. 90, p. 3957-3964.*
Wypych, G.; Handbook of Nucleating Agents, 2016, p. 33-51, 61-75, 205-215.*
SpecialChem, Universal Selector product data, p. 1-15, retrieved May 13, 2020 [url: https://polymer-additives.specialchem.com].*

(Continued)

*Primary Examiner* — Robert S Jones, Jr.
(74) *Attorney, Agent, or Firm* — Oblon, McClelland, Maier & Neustadt, L.L.P.

(57) ABSTRACT

The present invention relates to a process for producing a composition (I) at least comprising a compact thermoplastic polyurethane (P1), comprising the providing of at least one compact thermoplastic polyurethane (P1) or a reaction mixture for production of a compact thermoplastic polyurethane (R-P1), the adding of at least one compound (N) that has a conjugated, nitrogen-containing aromatic structure as nucleating agent to the at least one thermoplastic polyurethane (P1) or to the reaction mixture for production of a compact thermoplastic polyurethane (R-P1), wherein the compound (N) is a solid; and the mixing of the nucleating agent and the thermoplastic polyurethane (P1) or the reaction mixture (R-P1) to obtain a composition (I). The nucleating agent is used here in an amount in the range from 0.01% by weight to 2.0% by weight, based on the thermoplastic polyurethane (P1) or the reaction mixture (R-P1). Further relates the present composition comprising at least one compact thermoplastic polyurethane and at least one compound (N) that has a conjugated, nitrogen-containing aromatic structure as nucleating agent, wherein the compound (N) is a solid, and the use of the compounds mentioned as nucleating agents for a compact thermoplastic polyurethane.

10 Claims, No Drawings

(51) Int. Cl.

| | |
|---|---|
| *C08K 5/3437* | (2006.01) |
| *C08L 75/06* | (2006.01) |
| *C08L 75/08* | (2006.01) |
| *C08G 18/75* | (2006.01) |
| *C08K 5/3417* | (2006.01) |
| *C08G 18/06* | (2006.01) |
| *C08K 5/3415* | (2006.01) |
| *C08K 5/18* | (2006.01) |
| *C08K 5/3412* | (2006.01) |
| *C08K 5/16* | (2006.01) |
| *C08K 5/34* | (2006.01) |
| *C08K 3/105* | (2018.01) |

(56) References Cited

U.S. PATENT DOCUMENTS

| | | | |
|---|---|---|---|
| 6,214,917 | B1 | 4/2001 | Linzmeier et al. |
| 6,323,342 | B1 * | 11/2001 | Babler .............. C09B 48/00 106/497 |
| 6,995,202 | B2 | 2/2006 | Lake, Jr. et al. |
| 9,029,446 | B2 | 5/2015 | Yu et al. |
| 2008/0214729 | A1 | 9/2008 | Buter et al. |
| 2008/0312361 | A1 | 12/2008 | Wintermantel et al. |
| 2009/0076239 | A1 | 3/2009 | Xie et al. |
| 2014/0170352 | A1 | 6/2014 | Kamm et al. |
| 2015/0175736 | A1 | 6/2015 | Kim et al. |
| 2015/0210799 | A1 | 6/2015 | Tanaka |

FOREIGN PATENT DOCUMENTS

| | | |
|---|---|---|
| DE | 197 35 974 A1 | 2/1998 |
| DE | 10 2009 001 769 A1 | 10/2009 |
| EP | 0 199 021 A2 | 10/1986 |
| EP | 2 881 412 A1 | 6/2015 |
| KR | 10-1343465 13 | 12/2013 |
| WO | WO 2008/072514 A1 | 6/2008 |

OTHER PUBLICATIONS

Hoffman, Aktisil PF 777 technical data sheet, p. 1-2, retrieved May 13, 2020 [url: https://www.hoffmann-mineral.com/var/storage/original/application/361062cdc7174b0c8d1e8763f8724457.pdf?v1588764566].*
Fagelman, K.E., et al.; Dyes and Pigments, 2006, p. 62-73.*
International Search Report dated Jun. 1, 2017 in PCT/EP2017/053997 filed Feb. 22, 2017.
Jitka Kučerová, "Nucleating and clarifying agents for polymers", XP055276494, Retrieved from Internet; URL: http://digilib.k.utb.cz/bitstream/handle/10563/7290/kucerova_ 2008_bp.pdf?sequence=1 [retrieved on Jul. 28, 2016] (total pp. 36).
International Preliminary Report on Patentability dated Aug. 23, 2018 in PCT/EP2017/053997.
Hans Kittel , "5.4 Organische Pigmente", Pigmente, Füllstoffe und Farbmetrik, Lehrbuch der Lacke und Beschichtungen, Band 5, 2003, pp. 244-276.
Prof. Dr. W. Diller, et al., "Rohstoffe", Kapitel 3.1, Kunststoffhandbuch, Band 7, Polyurethane, 1993, 19 pages.
Prof. Dr.-Ing.Richard Vieweg, et al., "2.3 Zusatzstoffe", Kunststoffhandbuch, Band VII, 1966, 27 Pages.
C. Mathieu, et al., "Specificity and versatility of nucleating agents toward isotactic polypropylene crystal phases", Journal of Polymer Science Part B: Polymer Physics, vol. 40, 2002, pp. 2504-2515 and cover page.
Jan Broda, "Nucleating Activity of the Quinacridone and Phthalocyanine Pigments in Polypropylene Crystallization", Journ. Appl. Polym. Sci., vol. 90, 2003, pp. 3957-3964.

\* cited by examiner

NUCLEATING AGENT FOR COMPACT THERMOPLASTIC POLYURETHANES

The present invention relates to a process for producing a composition (I) at least comprising a compact polyurethane (P1), especially a compact thermoplastic polyurethane (P1), comprising the providing of at least one compact polyurethane (P1) or a reaction mixture for production of a compact polyurethane (R-P1), the adding of at least one compound (N) that has a conjugated, nitrogen-containing aromatic structure as nucleating agent to the at least one polyurethane (P1) or to the reaction mixture for production of a compact polyurethane (R-P1), wherein the compound (N) is a solid; and the mixing of the nucleating agent and the polyurethane (P1) or the reaction mixture (R-P1) to obtain a composition (I). The nucleating agent is used here in an amount in the range from 0.01% by weight to 2.0% by weight, based on the polyurethane (P1) or the reaction mixture (R-P1). Further relates the present composition comprising at least one compact polyurethane and at least one compound (N) that has a conjugated, nitrogen-containing aromatic structure as nucleating agent, wherein the compound (N) is a solid, and the use of the compounds mentioned as nucleating agents for a compact polyurethane, especially a compact thermoplastic polyurethane.

The prior art discloses various thermoplastic polyurethanes, especially compact thermoplastic polyurethanes. The properties of the compact thermoplastic polyurethanes can be varied within wide ranges by the use of different feedstocks or else by the use of additives. For example, EP 0 199 021 A2 discloses that the use of nucleating agents can affect the crystallization characteristics of polyurethanes.

For many applications, it is desirable to adjust the crystallization characteristics of compact thermoplastic polyurethanes and at the same time not to adversely affect the mechanical properties.

Proceeding from the prior art, it was thus an object of the present invention to provide compositions comprising compact thermoplastic polyurethanes or processes for production of compositions of this kind that are available in a simple and inexpensive manner, and the crystallization characteristics of which can be adjusted efficiently.

This object is achieved by a process for producing a composition (I) at least comprising a compact polyurethane (P1), at least comprising the steps of
  (i) providing at least one compact polyurethane (P1) or a reaction mixture for production of a compact polyurethane (R-P1);
  (ii) adding at least one compound (N) that has a conjugated, nitrogen-containing aromatic structure as nucleating agent to the at least one polyurethane (P1) or to the reaction mixture for production of a compact polyurethane (R-P1), wherein the compound (N) is a solid;
  (iii) mixing the nucleating agent and the polyurethane (P1) or the reaction mixture (R-P1) to obtain a composition (I),
wherein the amount of the sum total of the nucleating agents used is in the range from 0.01% by weight to 2.0% by weight, based on the polyurethane (P1) or the reaction mixture (R-P1).

This object is especially achieved in accordance with the invention by a process for producing a composition (I) at least comprising a compact thermoplastic polyurethane (P1), at least comprising the steps of
  (i) providing at least one compact thermoplastic polyurethane (P1) or a reaction mixture for production of a compact thermoplastic polyurethane (R-P1);
  (ii) adding at least one compound (N) that has a conjugated, nitrogen-containing aromatic structure as nucleating agent to the at least one thermoplastic polyurethane (P1) or to the reaction mixture for production of a compact thermoplastic polyurethane (R-P1), wherein the compound (N) is a solid;
  (iii) mixing the nucleating agent and the thermoplastic polyurethane (P1) or the reaction mixture (R-P1) to obtain a composition (I),
wherein the amount of the sum total of the nucleating agents used is in the range from 0.01% by weight to 2.0% by weight, based on the thermoplastic polyurethane (P1) or the reaction mixture (R-P1).

According to the invention, a compound (N) having a conjugated, nitrogen-containing aromatic structure is used as nucleating agent, where the compound (N) is a solid. In the context of the present invention, the compound (N) is also referred to as nucleating agent. This nucleating agent is selected, for example, from the group consisting of quinacridones, monoazo compounds, perylenes, diketopyrrolopyrroles, isoindolines and phthalocyanines or derivatives of these compounds.

The present invention therefore also relates to a process for producing a composition (I) at least comprising a compact polyurethane (P1), at least comprising the steps of
  (i) providing at least one compact polyurethane (P1) or a reaction mixture for production of a compact polyurethane (R-P1);
  (ii) adding at least one nucleating agent selected from the group consisting of quinacridones, monoazo compounds, perylenes, diketopyrrolopyrroles, isoindolines and phthalocyanines or derivatives of these compounds to the at least one polyurethane (P1) or to the reaction mixture for production of a compact polyurethane (R-P1);
  (iii) mixing the nucleating agent selected from the group consisting of quinacridones, monoazo compounds, perylenes, diketopyrrolopyrroles, isoindolines and phthalocyanines or derivatives of these compounds and the polyurethane (P1) or the reaction mixture (R-P1) to obtain a composition (I),
wherein the amount of the sum total of the nucleating agents used, selected from the group consisting of quinacridones, monoazo compounds, perylenes, diketopyrrolopyrroles, isoindolines and phthalocyanines or derivatives of these compounds, is in the range from 0.01% by weight to 2.0% by weight, based on the polyurethane (P1) or the reaction mixture (R-P1).

The present invention therefore further relates to a process for producing a composition (I) at least comprising a compact thermoplastic polyurethane (P1), at least comprising the steps of
  (i) providing at least one compact thermoplastic polyurethane (P1) or a reaction mixture for production of a compact thermoplastic polyurethane (R-P1);
  (ii) adding at least one nucleating agent selected from the group consisting of quinacridones, monoazo compounds, perylenes, diketopyrrolopyrroles, isoindolines and phthalocyanines or derivatives of these compounds to the at least one thermoplastic polyurethane (P1) or to the reaction mixture for production of a compact thermoplastic polyurethane (R-P1);
  (iii) mixing the nucleating agent selected from the group consisting of quinacridones, monoazo compounds, perylenes, diketopyrrolopyrroles, isoindolines and phthalocyanines or derivatives of these compounds and the thermoplastic polyurethane (P1) or the reaction mixture (R-P1) to obtain a composition (I), wherein the amount of the sum total of the nucleating agents used, selected from the group consisting of quinacridones, monoazo compounds, perylenes, diketopyrrolopyrroles, isoindolines and phthalocyanines or derivatives of these compounds, is in the range from 0.01% by weight to 2.0% by weight, based on the thermoplastic polyurethane (P1) or the reaction mixture (R-P1).

The use of a compound (N) having a conjugated, nitrogen-containing aromatic structure, such as quinacridones, monoazo compounds, perylenes, diketopyrrolopyrroles, isoindolines and phthalocyanines or derivatives of these compounds, as color pigment is known in principle. It has been found that, surprisingly, solid compounds having a conjugated, nitrogen-containing aromatic structure can be used in very small amounts in the range from 0.01% by weight to 2.0% by weight as strong nucleating agents for compact thermoplastic polyurethanes, which are nonpolar polymers.

Especially compounds selected from the group consisting of quinacridones, monoazo compounds, perylenes, diketopyrrolopyrroles, isoindolines and phthalocyanines or derivatives of these compounds, especially of quinacridone derivatives, in very small amounts in the range from 0.01% by weight to 2.0% by weight, act as strong nucleating agents for compact polyurethanes, especially compact thermoplastic polyurethanes.

In the context of the present invention, a compact polyurethane is understood to mean an unfoamed polyurethane, although the polyurethane may have residual porosity. In the context of the present invention, the nominal density of compact (unfoamed) polyurethane is within a range from 1000 to 1250 kg/m$^3$. In the context of the present invention, a compact polyurethane is also understood to mean a polyurethane having a density in the range from 95% to 100% of the nominal density of the polyurethane, preferably a density in the range from 98% to 100% of the nominal density of the polyurethane.

In the context of the present invention, compact polyurethanes are especially understood to mean compact thermoplastic polyurethanes or compact nonthermoplastic polyurethanes. For instance, the remarks which follow, unless stated otherwise, relate both to compact thermoplastic polyurethanes and to compact nonthermoplastic polyurethanes.

In the inventive composition (I) comprising a compact thermoplastic polyurethane, by comparison with the corresponding pure compact thermoplastic polyurethane, a rise in the crystallization temperature ($T_{cryst}$) is found. When the crystallization temperature, proceeding from a TPU melt, meaning that, in particular, the hard phase of the thermoplastic polyurethane has completely melted, is determined at a cooling rate of 20° C./min, said crystallization temperature has preferably increased by 10° C., further preferably by 30° C., more preferably by 50° C., compared to the thermoplastic polyurethane without the addition of the nucleating agent of the invention in an amount in the range from 0.01% by weight to 2.0% by weight, based on the thermoplastic polyurethane (P1).

At the same time, in the context of the present invention, there is preferably no adverse effect on the molecular weight of the polyurethane used, especially of the thermoplastic polyurethane. Preferably, there is also no adverse effect on the mechanical properties of the polyurethane used, especially the thermoplastic polyurethane.

In the context of the present invention, it has been found that, surprisingly, the compositions of the invention or molding compounds produced therefrom, immediately after undergoing the injection molding process, can have improved mechanical properties, for example low values on determination of compression set.

The process of the invention comprises steps (i) to (iii). First of all, in step (i), a compact polyurethane (P1) or a reaction mixture for production of a compact polyurethane (R-P1) is provided. In step (ii), a nucleating agent as defined above is then added to the at least one polyurethane (P1) or to the reaction mixture for production of a compact polyurethane (R-P1), wherein the amount of the sum total of the nucleating agents used is in the range from 0.01% by weight to 2.0% by weight, based on the polyurethane (P1) or the reaction mixture (R-P1). In step (iii), the nucleating agent and the polyurethane (P1) or the reaction mixture (R-P1) are mixed to obtain a composition (I).

The addition or the mixing is preferably effected in apparatuses that are used customarily for mixing of substances, for example in drum mixers, in mills, in screw or disk extruders, roll mills or kneaders. The at least one compact thermoplastic polyurethane (P1) or the reaction mixture (R-P1) and the at least one nucleating agent are mixed with one another in the mixing apparatus typically at an elevated temperature, especially within the melting range of the compact thermoplastic polyurethane (P1) used. The mixing operation is generally effected at pressures of 1 to 200 bar with mean residence times of 0.5 to 60 minutes. If the nucleating agent is added to the reaction mixture (R-P1), this is typically effected in accordance with the invention under the conditions under which the components of the reaction mixture (R-P1) are mixed.

The process of the invention may include further steps, especially thermal treatments of the composition (I). In a further embodiment, the present invention accordingly also relates to a process for producing a composition (I) at least comprising a compact thermoplastic polyurethane (P1) as described above, wherein the process comprises steps (iv) and (v):

(iv) heating the composition (I) to a temperature in the region of the melting range of the thermoplastic polyurethane (P1) with at least partial melting of the thermoplastic polyurethane (P1);

(v) cooling the composition.

In an alternative embodiment, the process for producing a composition (I) at least comprising a compact polyurethane (P1) may also comprise steps (iv') and (v'):

(iv') heating the composition (I) to a temperature in the region of the softening range of the polyurethane (P1) with at least partial softening of the polyurethane (P1);

(v') cooling the composition.

In the context of the present invention, the cooling in step (v) is typically effected at a cooling rate in the region of cooling rates that are used in DSC measurements, for example at a cooling rate of 20° C./min.

In step (iv), the composition (I) is heated to a temperature in the region of the melting range of the thermoplastic polyurethane (P1) with at least partial melting of the thermoplastic polyurethane (P1). Finally, in step (v), the composition (I) is cooled.

According to the invention, the heating can be effected in any suitable manner known to the person skilled in the art. Preferably, the heating is effected by electrical heating, heating via heated oil or water, mechanical friction, shear, induction fields, hot air, IR radiation or high-energy radiation (laser).

According to the invention, the composition (I) is heated in step (iv) to a temperature in the region of the melting range of the thermoplastic polyurethane (P1) with at least partial melting of the thermoplastic polyurethane (P1). Thermoplastic polyurethanes suitable in accordance with the invention have, for example, a melting temperature in the range from 140 to 250° C. Preferably, the composition (I) in step (iv) is heated to a temperature in the region of the melting temperature of the hard phase or above the melting temperature of the hard phase of the thermoplastic polyurethane (P1).

In a further embodiment, the present invention accordingly also relates to a process for producing a composition (I) at least comprising a compact thermoplastic polyurethane (P1) as described above, wherein the composition (I) is heated in step (iv) to a temperature in the region of the melting temperature of the hard phase or above the melting temperature of the hard phase of the thermoplastic polyurethane (P1).

In the context of the present invention, the melting temperature is understood to mean the greatest melting endotherm in the first heating run in DSC at a heating rate of 20° C./min. In the context of the present invention, the melting temperature is determined after heat treatment of the material at a temperature within a range from 60 to 100° C. for a period in the range from 8 to 25 hours.

Preferably, the compact thermoplastic polyurethane, after heat treatment at a temperature within a range from 60 to 100° C. for a period in the range from 8 to 25 hours, has its greatest melting endotherm in the first heating run in DSC at a heating rate of 20° C./min at a temperature in the range from 100 to 260° C., further preferably in the range from 140° C. to 250° C., more preferably in the range from 160° C. to 240° C. In the context of the present invention, the melting temperature is determined by means of DSC on predried samples, unless stated otherwise.

In the context of the present invention, the polyurethane (P1) may be uncrosslinked, partly crosslinked or fully crosslinked.

The process according to the invention may comprise further steps, for example including shaping steps. According to the invention, it is also possible to combine the individual steps of the process, such that the mixing and the heating can take place in an extruder, for example. Further suitable processes are, for example, injection molding processes or processes for film or fiber production.

It has been found that, surprisingly, specifically the amount of the nucleating agents used, especially of the quinacridone derivatives, the diketopyrrolopyrroles and the phthalocyanines, has a strong nucleating effect. By virtue of the small amount used, there is additionally only a minor degree, if any, of deterioration in the other properties of the compact thermoplastic polyurethane.

Preferably, the amount of the sum total of the compound (N) used is in the range from 0.02% by weight to 1.0% by weight, based on the polyurethane (P1), preferably in the range from 0.03% by weight to 0.5% by weight, further preferably in the range from 0.05% by weight to 0.3% by weight, for example in the range from 0.08% by weight to 0.25% by weight, especially preferably in the range from 0.1% by weight to 0.2% by weight, based in each case on the polyurethane (P1) or the reaction mixture (R-P1).

Preferably, for example, the amount of the sum total of the nucleating agents used that are selected from the group consisting of quinacridones, monoazo compounds, perylenes, diketopyrrolopyrroles, isoindolines and phthalocyanines or derivatives of these compounds is in the range from 0.02% by weight to 1.0% by weight, based on the polyurethane (P1), preferably in the range from 0.03% by weight to 0.5% by weight, further preferably in the range from 0.05% by weight to 0.3% by weight, for example in the range from 0.08% by weight to 0.25% by weight, especially preferably in the range from 0.1% by weight to 0.2% by weight, based in each case on the polyurethane (P1) or the reaction mixture (R-P1).

In a further embodiment, the present invention accordingly also relates to a process for producing a composition (I) at least comprising a compact polyurethane (P1) as described above, wherein the amount of the sum total of the nucleating agents used is in the range from 0.04% by weight to 0.3% by weight, based on the polyurethane (P1) or the reaction mixture (R-P1).

According to the invention, at least one compound (N) having a conjugated, nitrogen-containing aromatic structure is used as nucleating agent, where the compound (N) is a solid. For example, a nucleating agent selected from the group consisting of quinacridones, monoazo compounds, perylenes, diketopyrrolopyrroles, isoindolines and phthalocyanines or derivatives of these compounds is used. These compounds have aromatic systems. Especially suitable compounds in the context of the present invention are those that are used as organic pigments. Such products form part of the prior art for coloring of coatings or plastics. A detailed list can be found in the reference "Lehrbuch der Lacke und Beschichtungen" [Textbook of Paints and Coatings] by Hans Kittel, volume 5 (5. Pigmente, FIllstoffe und Farbmetrik [Pigments, Fillers and Colorimetry]/volume ed. Jürgen Spille), chapter 5.4, 2003, ISBN 3-7776-1015-1.

Suitable nucleating agents have been found to be, for example, quinacridones, monoazo compounds, perylenes, diketopyrrolopyrroles, isoindolines and phthalocyanines or derivatives of these compounds. Particularly suitable nucleating agents in the context of the present invention are compounds selected from the group consisting of quinacridones, diketopyrrolopyrroles and phthalocyanines or derivatives of these compounds.

In a further embodiment, the present invention accordingly also relates to a process for producing a composition (I) at least comprising a compact polyurethane (P1) as described above, wherein the nucleating agent is selected from the group consisting of quinacridones, monoazo compounds, perylenes, diketopyrrolopyrroles, isoindolines and phthalocyanines or derivatives of these compounds.

In a further embodiment, the present invention accordingly also relates to a process for producing a composition (I) at least comprising a compact polyurethane (P1) as described above, wherein the nucleating agent is selected from the group consisting of quinacridones, diketopyrrolopyrroles and phthalocyanines or derivatives of these compounds.

In a further embodiment, the present invention accordingly also relates to a process for producing a composition (I) at least comprising a compact polyurethane (P1), at least comprising the steps of (i) providing at least one compact polyurethane (P1) or a reaction mixture for production of a compact polyurethane (R-P1);

(ii) adding at least one nucleating agent selected from the group consisting of quinacridones, diketopyrrolopyrroles and phthalocyanines or derivatives of these compounds to the at least one polyurethane (P1) or to the reaction mixture for production of a compact polyurethane (R-P1);

(iii) mixing the nucleating agent selected from the group consisting of quinacridones, diketopyrrolopyrroles and phthalocyanines or derivatives of these compounds and the polyurethane (P1) or the reaction mixture (R-P1) to obtain a composition (I), wherein the amount of the sum total of the nucleating agents used, selected from the group consisting of quinacridones, diketopyrrolopyrroles and phthalocyanines or derivatives of these compounds, is in the range from 0.01% by weight to 2.0% by weight, based on the polyurethane (P1) or the reaction mixture (R-P1).

Examples of compounds suitable in accordance with the invention are the following families with the corresponding Colour Index (C.I.):

| | |
|---|---|
| monoazo: | non-laked yellow 1, 3, 5, 6, 60, 65, 73, 74, |
| 75, 113, | 97, 98, 111, 116, orange 1; laked yellow |
| | 168, 169, 183, 190, 191; |
| perylenes 29; | red 123, 149, 178, 179, 190, 224 and violet |
| phthalocyanines | blue 15, 15:1, 15:2, 15:3, 15:4, 15:6, 16, |
| 68, and | green 7, 36; |
| quinacridones | orange 48, 49, red 122, 192, 202, |
| 206, 207, 209, | violet 19, 30, 42; |
| diketopyrrolopyrroles | red 254, 255; |
| isoindolines/ones | yellow 110, 139, 173, 185, orange 61, 66, |
| 69, red | g260 and brown 38. |

In principle, the compounds used as nucleating agents can also be subjected to a treatment in order, for example, to improve miscibility with the compact polyurethane. In a further embodiment, the present invention accordingly also relates to a process for producing a composition (I) at least comprising a compact polyurethane (P1) as described above, wherein a nucleating agent that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.

Typically, the nucleating agents are used in solid form in the context of the present invention. Preferably, the at least one nucleating agent has a high specific surface area (typically determined by means of the gas adsorption BET method according to ISO 9277), for example a specific surface area in the range from 10 $m^2/g$ to 150 $m^2/g$, preferably specific surface area of greater than 35 $m^2/g$, further preferably of greater than 55 $m^2/g$.

In a further embodiment, the present invention accordingly also relates to a process for producing a composition (I) at least comprising a compact polyurethane (P1) as described above, wherein the nucleating agent is used in the form of a solid having a specific surface area in the range from 10 $m^2/g$ to 150 $m^2/g$.

According to the invention, in one embodiment, at least one quinacridone derivative is used as nucleating agent. Suitable compounds are known per se to the person skilled in the art and are also used in larger volumes as color pigments. Suitable quinacridone derivatives are, for example, substituted or unsubstituted quinacridone derivatives, substituted or unsubstituted dihydroquinacridone derivatives and substituted or unsubstituted quinacridone-quinone derivatives.

In a further embodiment, the present invention accordingly also relates to a process for producing a composition (I) at least comprising a compact polyurethane (P1) as described above, wherein the quinacridone derivative is selected from the group consisting of quinacridone derivatives of the formula (I), dihydroquinacridone derivatives of the formula (II) and quinacridonequinone derivatives of the formula (III):

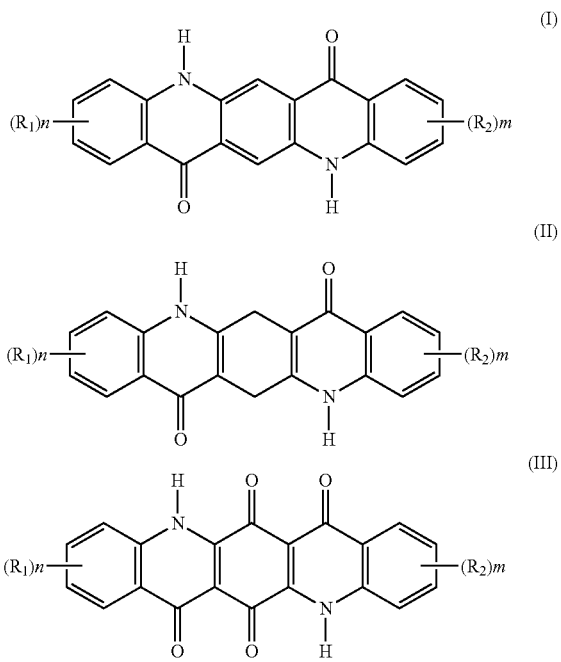

where $R_1$ and $R_2$ are independently selected from the group consisting of fluorine, chlorine, bromine, C1 to C6-alkyl or C1-C6-alkoxy, and n and m are independently an integer from 0 to 4. n and m are preferably independently 0 or 1.

According to the invention, it is also possible to use mixtures of two or more quinacridone derivatives.

According to the invention, the quinacridone derivatives used may have different substitutions. Preference is given to using quinacridone derivatives having halogen substituents or alkyl substituents, for example having chlorine or methyl substituents. Suitable compounds are, for example, compounds having the following structures:

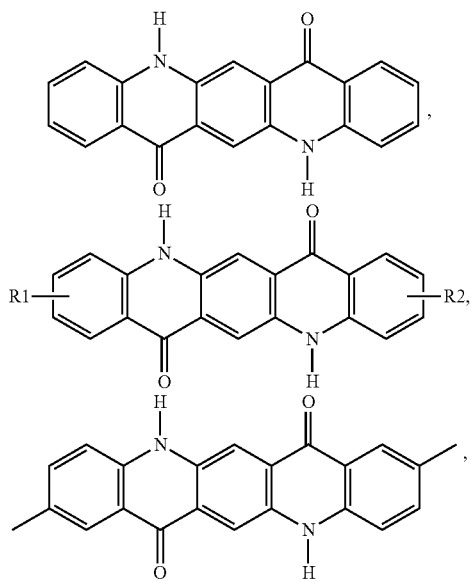

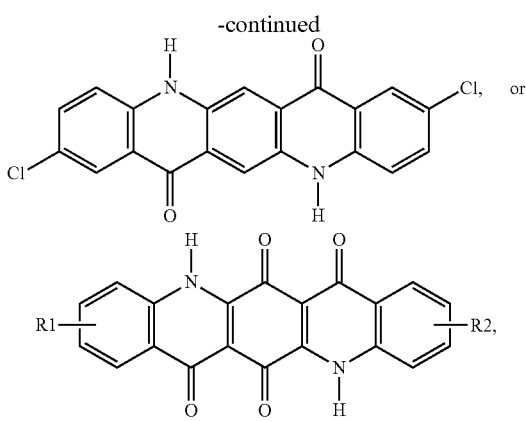

where R1, R2, n and m are as defined above.

According to the invention, the at least one quinacridone derivative can additionally be subjected to a treatment in order, for example, to improve miscibility with the at least one polyurethane.

In a further embodiment, the present invention accordingly also relates to a process for producing a composition (I) at least comprising a compact polyurethane (P1) as described above, wherein the quinacridone derivative that has been subjected to a treatment comprising grinding, treatment with a solvent, acids, alkalis, bleaches, crystallization or extraction, and finishing operations to reduce or prevent flocculation or lump formation, finishing operations to control the particle size (for example growth inhibitors), or finishing operations to regulate the viscosity is used.

Preferably, the at least one quinacridone derivative has a high specific surface area (typically determined by means of the gas adsorption BET method according to ISO 9277), for example a specific surface area in the range from 10 m$^2$/g to 150 m$^2$/g, preferably specific surface area of greater than 35 m$^2$/g, further preferably of greater than 55 m$^2$/g. In a further embodiment, the present invention accordingly also relates to a process for producing a composition (I) at least comprising a compact thermoplastic polyurethane (P1) as described above, wherein the quinacridone derivative is used in the form of a solid having a specific surface area in the range from 10 m$^2$/g to 150 m$^2$/g.

According to the invention, in a further embodiment, at least one diketopyrrolopyrrole derivative is used as nucleating agent. Suitable compounds are known per se to the person skilled in the art and are also used in larger volumes as color pigments.

Accordingly, the present invention also relates to a process for producing a composition (I) at least comprising a compact polyurethane (P1), at least comprising the steps of (i) providing at least one compact polyurethane (P1) or a reaction mixture for production of a compact polyurethane (R-P1);

(ii) adding at least one diketopyrrolopyrrole derivative to the at least one polyurethane (P1) or to the reaction mixture for production of a compact polyurethane (R-P1);

(iii) mixing the diketopyrrolopyrrole derivative and the polyurethane (P1) or the reaction mixture (R-P1) to obtain a composition (I), wherein the amount of the sum total of the diketopyrrolopyrrole derivative used is in the range from 0.01% by weight to 2.0% by weight, based on the polyurethane (P1) or the reaction mixture (R-P1).

In a further embodiment, the present invention also relates to a process for producing a composition (I) at least comprising a compact polyurethane (P1) as described above, wherein the diketopyrrolopyrrole derivative is selected from the group consisting of diketopyrrolopyrrole derivatives of the formula (IV):

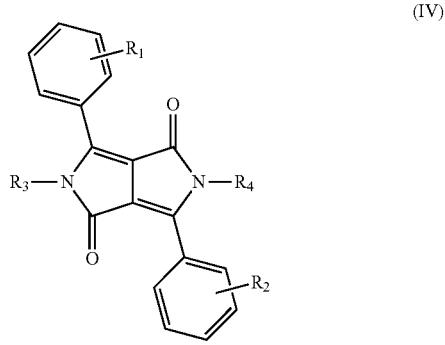

(IV)

where R1 and R2 are independently selected from the groups consisting of hydrogen, $C_1$-$C_{18}$-alkyl, $C_1$-$C_4$-alkoxy, phenyl, cyano or halogen and R3 and R4 are also independently selected from the group consisting of hydrogen, $C_1$-$C_{18}$-alkyl, $C_3$-$C_{12}$-alkenyl, $C_3$-$C_5$-alkynyl, $C_2$-$C_5$-alkoxycarbonyl, carbamoyl, $C_2$-$C_{13}$-alkyl, $C_1$-$C_4$-alkoxycarbonyl, phenyl or phenyl substituted by chlorine, bromine, $C_1$-$C_4$-alkyl, $C_1$-$C_4$-alkoxy, trifluoromethyl or nitro.

According to the invention, it is also possible to use mixtures of two or more diketopyrrolopyrrole derivatives.

According to the invention, the diketopyrrolopyrrole derivatives used may have different substitutions. Preference is given to using diketopyrrolopyrrole derivatives having halogen substituents or aromatic substituents, for example having chlorine or phenyl substituents. Suitable compounds are, for example, compounds having the following structures:

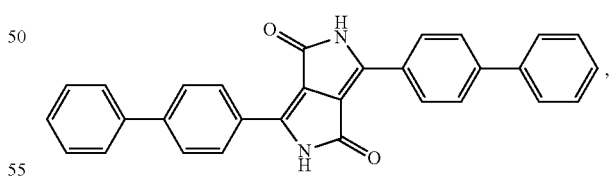

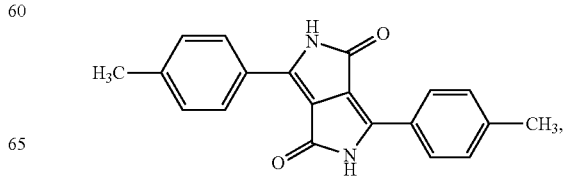

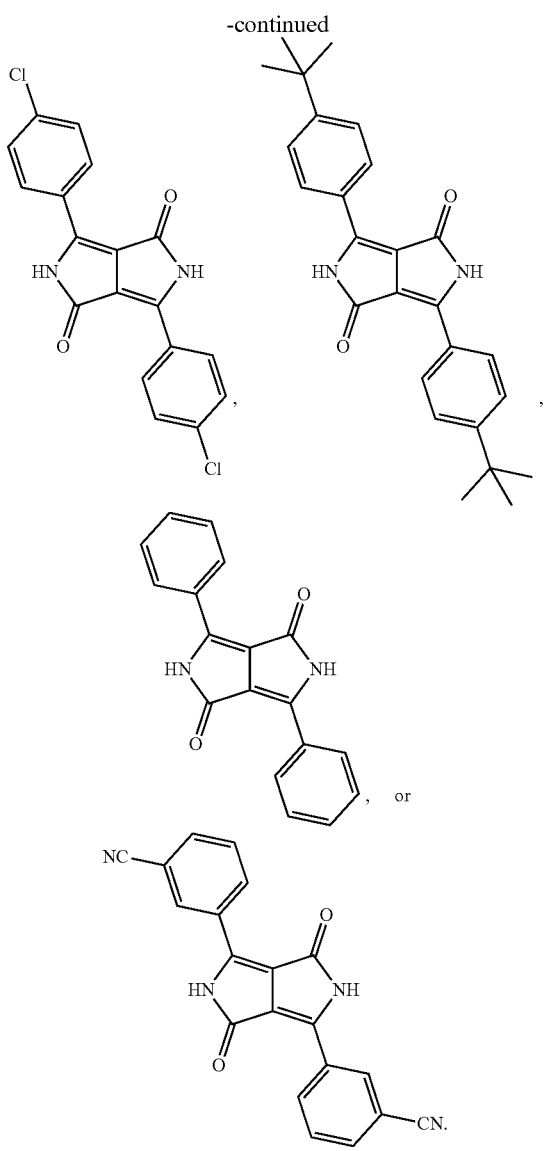

According to the invention, a diketopyrrolopyrrole derivative can additionally be subjected to at least one treatment in order, for example, to improve miscibility with the at least one polyurethane.

In a further embodiment, the present invention accordingly also relates to a process for producing a composition (I) at least comprising a compact polyurethane (P1) as described above, wherein the diketopyrrolopyrrole derivative that has been subjected to a treatment comprising grinding, treatment with a solvent, acids, alkalis, bleaches, crystallization or extraction, and treatments with finishing operations to reduce or prevent flocculation or lump formation, finishing operations to control the particle size (for example growth inhibitors), or finishing operations to regulate the viscosity is used.

Preferably, the at least one diketopyrrolopyrrole derivative has a high specific surface area (typically determined by means of the gas adsorption BET method according to ISO 9277), for example a specific surface area in the range from 10 $m^2/g$ to 150 $m^2/g$, preferably specific surface area of greater than 35 $m^2/g$, further preferably of greater than 55 $m^2/g$. In a further embodiment, the present invention accordingly also relates to a process for producing a composition (I) at least comprising a compact thermoplastic polyurethane (P1) as described above, wherein the diketopyrrolopyrrole derivative is used in the form of a solid having a specific surface area in the range from 10 $m^2/g$ to 150 $m^2/g$, further preferably greater than 50 $m^2/g$.

Preferably, the diketopyrrolopyrrole derivative is used in an amount within a range from 0.02% by weight to 1.0% by weight, based on the thermoplastic polyurethane (P1), further preferably in the range from 0.04% by weight to 0.3% by weight, based in each case on the thermoplastic polyurethane (P1).

According to the invention, it is also possible to use phthalocyanines as nucleating agents. Accordingly, the present invention also relates to a process for producing a composition (I) at least comprising a compact polyurethane (P1), at least comprising the steps of (i) providing at least one compact polyurethane (P1) or a reaction mixture for production of a compact polyurethane (R-P1);

(ii) adding at least one phthalocyanine derivative to the at least one polyurethane (P1) or to the reaction mixture for production of a compact polyurethane (R-P1);

(iii) mixing the phthalocyanine derivative and the polyurethane (P1) or the reaction mixture (R-P1) to obtain a composition (I), wherein the amount of the sum total of the phthalocyanine derivative used is in the range from 0.01% by weight to 2.0% by weight, based on the polyurethane (P1) or the reaction mixture (R-P1).

In a further embodiment, the present invention also relates to a process for producing a composition (I) at least comprising a compact polyurethane (P1) as described above, wherein the phthalocyanine derivative is selected from the group consisting of aluminum phthalocyanine, nickel phthalocyanine, cobalt phthalocyanine, iron phthalocyanine, zinc phthalocyanine, copper phthalocyanine, polychloro copper phthalocyanine, hexadecachlorophthalocyanine, hexadecabromophthalocyanine and manganese phthalocyanine and derivatives thereof.

For example, in the context of the present invention, it is possible to use the following phthalocyanines or derivatives thereof:

aluminum phthalocyanine, for example with CAS No.: 14154-42-8, nickel phthalocyanine, for example with CAS No.: 14055-02-8, cobalt phthalocyanine, for example with CAS No.: 3317-67-7, iron phthalocyanine, for example with CAS No.: 132-16-1, zinc phthalocyanine, for example with CAS No.: 14320-04-08, copper phthalocyanine, for example with CAS No.: 147-14-8, polychloro copper phthalocyanine, for example with CAS No.: 1328-53-6, hexadecachlorophthalocyanine, for example with CAS No.: 28888-81-5, hexadecabromophthalocyanine, for example with CAS No.: 28746-04-5, manganese phthalocyanine, for example with CAS No.: 14325-24-7.

In the context of the present invention, preference is given to copper phthalocyanine having the following structure or derivatives thereof:

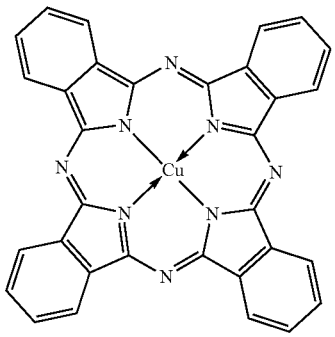

In the context of the present invention, the term "compact polyurethane" encompasses both compact thermoplastic polyurethanes and compact nonthermoplastic polyurethanes.

Compact thermoplastic polyurethanes (P1) used in accordance with the invention may be any standard compact thermoplastic polyurethanes. In the context of the present invention, it is also possible that mixtures of different compact thermoplastic polyurethanes are used. Compact nonthermoplastic polyurethanes (P1) used in accordance with the invention may be any standard compact nonthermoplastic polyurethanes. In the context of the present invention, it is also possible that mixtures of different compact nonthermoplastic polyurethanes are used.

Compact nonthermoplastic polyurethanes may, for example, be partly crosslinked or crosslinked polyurethanes, for example including cast elastomers. Owing to their crosslinking, cast elastomers frequently have a very low Tg of the soft phase and better thermal stabilities than thermoplastic polyurethanes.

Compact thermoplastic polyurethanes are typically produced by means of at least one polyol composition, at least one chain extender, and at least one polyisocyanate composition. Accordingly, a reaction mixture for production of a compact thermoplastic polyurethane (R-P1) typically comprises at least one polyol composition, at least one chain extender, and at least one polyisocyanate composition. In the context of the present invention, it is possible that the nucleating agent is added, for example, to the polyol composition. It is likewise possible that the nucleating agent is added to the reaction mixture after addition of all components, i.e. more particularly after the mixing of the polyol composition and the isocyanate composition.

Suitable polyol compositions for production of thermoplastic polyurethanes are known in principle to those skilled in the art. Suitable polyols are selected, for example, from the group consisting of polyetherols, polyesterols, polycarbonate alcohols and hybrid polyols, preferably selected from the group consisting of polyetherols and polyesterols. Particular preference is given to polyester polyols, for example those based on adipic acid and a diol. Suitable diols are especially butane-1,4-diol, hexane-1,6-diol or mixtures of these compounds.

Polyols of this kind are known to those skilled in the art and described for example in "Kunststoffhandbuch [Plastics Handbook], volume 7, Polyurethane [Polyurethanes]", Carl Hanser Verlag, 3rd edition 1993, chapter 3.1. Particular preference is given to using polyetherols or polyesterols as polyols. It is likewise possible to use polycarbonates. Copolymers may also be used in the context of the present invention. The number-average molecular weight of polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

Preferred polyetherols are in accordance with the invention polyethylene glycols, polypropylene glycols and polytetrahydrofurans.

Preferably, the polyols used have an average OH functionality between 1.8 and 2.3, preferably between 1.9 and 2.2, especially 2. Preferably, the polyols used in accordance with the invention have solely primary hydroxyl groups.

According to the invention, the polyol may be used in pure form or in the form of a composition comprising the polyol and at least one solvent. Suitable solvents are known per se to those skilled in the art.

For production of the thermoplastic polyurethanes, it is also possible to use a chain extender, but it is also possible to use mixtures of different chain extenders.

Chain extenders used may typically be compounds having hydroxyl or amino groups, especially having 2 hydroxyl or amino groups. According to the invention, however, it is also possible that mixtures of different compounds are used as chain extenders. According to the invention, the average functionality of the mixture is 2.

Preference is given in accordance with the invention to using compounds having hydroxyl groups as chain extenders, especially diols. It is preferably possible to use aliphatic, araliphatic, aromatic and/or cycloaliphatic diols having a molecular weight of 50 g/mol to 220 g/mol. Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, propane-1,3-diol, butane-1,4-diol, hexane-1,6-diol. It is also possible to use aromatic compounds such as hydroxyquinone bis(2-hydroxyethyl) ether.

According to the invention, it is also possible to use compounds having amino groups, for example diamines. It is likewise possible to use mixtures of diols and diamines.

The chain extender is preferably a diol having a molecular weight Mw<220 g/mol. According to the invention, it is possible that only one diol having a molecular weight Mw<220 g/mol is used for production of the thermoplastic polyurethane.

In a further embodiment, the chain extender is selected from the group consisting of butane-1,4-diol and hydroxyquinone bis(2-hydroxyethyl) ether.

In addition, at least one polyisocyanate is used for production of the thermoplastic polyurethane. According to the invention, it is also possible to use mixtures of two or more polyisocyanates.

Preferred polyisocyanates in the context of the present invention are diisocyanates, especially aliphatic or aromatic diisocyanates, further preferably aromatic diisocyanates.

In a further embodiment, the present invention accordingly relates to a process as described above, wherein the polyisocyanate is an aromatic diisocyanate.

In addition, in the context of the present invention, it is possible to use prereacted prepolymers in which some of the OH components have been reacted with an isocyanate in a preceding reaction step. These prepolymers are reacted with the remaining OH components in a further step, the actual polymer reaction, and then form the thermoplastic polyurethane. The use of prepolymers makes it possible also to use OH components having secondary alcohol groups.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcydohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcydohexane and methylene dicyclohexyl 4,4'-, 2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trimethyl-5-isocyanatomethylcycohexane or mixtures thereof.

In a further embodiment, the present invention accordingly relates to a process as described above, wherein the polyisocyanate is selected from the group consisting of methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI) or mixtures thereof.

Suitable aromatic diisocyanates are especially diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or phenylene diisocyanate.

Preferred aromatic polyisocyanates are diphenylmethane 2,2'-, 2,4'- and/or 4,4'-diisocyanate (MDI) and mixtures thereof.

Preferred examples of higher-functionality isocyanates are triisocyanates, e.g. triphenylmethane 4,4',4"-triisocyanate, and also the cyanurates of the aforementioned diisocyanates, and the oligomers obtainable by partial reaction of diisocyanates with water, for example the biurets of the aforementioned diisocyanates, and also oligomers obtainable by controlled reaction of semiblocked diisocyanates with polyols having an average of more than 2 and preferably 3 or more hydroxyl groups.

According to the invention, the polyisocyanate may be used in pure form or in the form of a composition comprising the polyisocyanate and at least one solvent. Suitable solvents are known to those skilled in the art. Suitable examples are nonreactive solvents such as ethyl acetate, methyl ethyl ketone and hydrocarbons.

According to the invention, in the reaction of the at least one aliphatic polyisocyanate, the at least one chain extender, and the at least one polymer composition, it is possible to add further feedstocks, for example catalysts or auxiliaries and additives.

Suitable auxiliaries and additives are known per se to those skilled in the art. Examples include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, fibers, reinforcers and plasticizers. Suitable assistants and additives may be found, for example in Kunststoffhandbuch [Plastics Handbook], volume VII, published by Vieweg and Hochtlen, Carl Hanser Verlag, Munich 1966 (p. 103-113).

Suitable catalysts are likewise known in principle from the prior art.

According to the invention, it is especially possible that the nucleating agent is used in combination with further additives, for example waxes.

In a further embodiment, the present invention accordingly also relates to a process for producing a composition (I) at least comprising a compact thermoplastic polyurethane (P1) as described above, wherein the nucleating agent is used in combination with a further additive.

Suitable additives, in addition to those mentioned above, are disclosed, for example, in DE 19735974 A1, especially at page 9 line 62 to page 12 line 4. Additives used in the context of the present invention are selected, for example, from an antioxidant, a light stabilizer, a metal deactivator, a stabilizer, a filler, a flame retardant, a plasticizer, a demolding agent, a wax, a blowing agent, a further nucleating agent, a processing agent, a dye, a pigment or a combination of at least two additives.

Preferred co-additives are waxes. Waxes suitable in accordance with the invention are notable for the following main features: kneadable at 20° C.; firm to brittle hardness; coarsely to finely crystalline, translucent or opaque, but not vitreous; melting without decomposition above 40° C.; of comparatively low viscosity even just above the melting point; polishable under gentle pressure.

Waxes used may be natural or synthetic waxes. The natural waxes are fossil or nonfossil waxes. The fossil waxes come from oil (ozokerite, macrocrystalline paraffin waxes, microcrystalline paraffin waxes), or from brown coal or peat (montan waxes, with acids, esters or hydrolyzed derivatives). The nonfossil waxes are either animal waxes (beeswax, shellac wax, wool wax) or vegetable waxes (carnauba wax, candelilla wax, rice wax). The synthetic waxes are partly synthetic (fatty acid amide waxes, for example ethylenebisstearamide or erucamide) or fully synthetic (polyolefin wax, including polyethylene waxes, polypropylene waxes), Fisher-Tropsch waxes, or polar synthetic waxes (oxidized PE waxes, grafted or otherwise modified PO waxes, copolymers). Preference is given to ester and amide waxes.

The present invention also relates to a composition comprising at least one compact thermoplastic or nonthermoplastic polyurethane and at least one compound (N) having a conjugated, nitrogen-containing aromatic structure as nucleating agent, wherein the compound (N) is a solid and the nucleating agent is present in the composition in an amount in the range from 0.04% to 0.1% by weight, based on the thermoplastic or nonthermoplastic polyurethane.

The present invention additionally relates to a composition comprising at least one compact thermoplastic or nonthermoplastic polyurethane and at least one nucleating agent selected from the group consisting of quinacridones, monoazo compounds, perylenes, diketopyrrolopyrroles, isoindolines and phthalocyanines or derivatives of these compounds, wherein the nucleating agent is present in the composition in an amount in the range from 0.04% to 0.1% by weight, based on the thermoplastic or nonthermoplastic polyurethane.

The present invention also relates to a composition at least comprising a compact thermoplastic or nonthermoplastic polyurethane and at least one nucleating agent, obtained or obtainable by a process of the invention. The present invention further relates to a composition at least comprising a compact thermoplastic or nonthermoplastic polyurethane and at least one nucleating agent selected from the group consisting of quinacridones, monoazo compounds, perylenes, diketopyrrolopyrroles, isoindolines and phthalocyanines or derivatives of these compounds, obtained or obtainable by a process of the invention.

The present invention relates, for example, to a composition comprising at least one compact thermoplastic or nonthermoplastic polyurethane and at least one quinacridone derivative as described above, and to shaped bodies that can be produced from such a composition.

The present invention also relates to a composition comprising at least one compact thermoplastic or nonthermoplastic polyurethane and at least one diketopyrrolopyrrole derivative as described above, and to shaped bodies that can be produced from such a composition.

The present invention also relates to a composition comprising at least one compact thermoplastic or nonthermoplastic polyurethane and at least one phthalocyanine derivative as described above, and to shaped bodies that can be produced from such a composition.

The present invention also relates to the use of at least one compound (N) having a conjugated, nitrogen-containing aromatic structure as nucleating agent for a compact thermoplastic or nonthermoplastic polyurethane, wherein the compound (N) is a solid and the nucleating agent is used in an amount in the range from 0.01% to 2.0% by weight, based on the thermoplastic or nonthermoplastic polyurethane. For example, the present invention relates to the use of at least one compound selected from the group consisting of quinacridones, monoazo compounds, perylenes, diketopyrrolopyrroles, isoindolines and phthalocyanines or derivatives of these compounds as nucleating agent for a compact thermoplastic or nonthermoplastic polyurethane, wherein the compound is used in an amount in the range from 0.01% to 2.0% by weight, based on the thermoplastic or nonthermoplastic polyurethane.

The present invention thus also relates to the use of at least one compound selected from the group consisting of quinacridones, diketopyrrolopyrroles and phthalocyanines or derivatives of these compounds as nucleating agent for a compact thermoplastic or nonthermoplastic polyurethane, wherein the compound selected from the group consisting of quinacridones, diketopyrrolopyrroles and phthalocyanines or derivatives of these compounds is used in an amount in the range from 0.01% to 2.0% by weight, based on the thermoplastic or nonthermoplastic polyurethane.

Preferably, the nucleating agent is used in an amount in the range from 0.02% by weight to 1.0% by weight, based on the thermoplastic or nonthermoplastic polyurethane (P1), further preferably in the range from 0.04% by weight to 0.3% by weight, more preferably in the range from 0.05% by weight to 0.1, further preferably 0.06% by weight to 0.08% by weight, based in each case on the thermoplastic or nonthermoplastic polyurethane (P1).

In the case of thermoplastic polyurethanes, surprisingly, an increase in the crystallization temperature was observed when at least one compound (N) was used. The present invention also relates to the use of at least one compound (N) having a conjugated, nitrogen-containing aromatic structure for increasing the crystallization temperature $T_{cryst}$ of a compact thermoplastic polyurethane, wherein the compound (N) is a solid and is added to the thermoplastic polyurethane in an amount of 0.01% to 2.0% by weight, based on the thermoplastic polyurethane.

The present invention further relates to the use of at least one nucleating agent selected from the group consisting of quinacridones, monoazo compounds, perylenes, diketopyrrolopyrroles, isoindolines and phthalocyanines or derivatives of these compounds for increasing the crystallization temperature $T_{cryst}$ of a compact thermoplastic polyurethane, wherein the nucleating agent is added to the thermoplastic polyurethane in an amount within a range from 0.01% to 2.0% by weight, based on the thermoplastic polyurethane.

The present invention also further relates to the use of a compound selected from the group consisting of quinacridones, diketopyrrolopyrroles and phthalocyanines or derivatives of these compounds for increasing the crystallization temperature $T_{cryst}$ of a thermoplastic polyurethane, wherein the nucleating agent is added to the thermoplastic polyurethane in an amount within a range from 0.01% to 2.0% by weight, based on the thermoplastic polyurethane.

It has been observed that, by virtue of the increase in crystallization in an immediately subsequent second heating run in DSC, a hard phase that does not melt until higher temperatures was detectable.

In a further embodiment, the present invention also relates to the use as described above, wherein the nucleating agent is used in combination with a further additive selected from carbon black and wax-based demolding agents.

For example, the nucleating agent is used in a concentration in the range from 0.01% by weight to 2% by weight, preferably in the range from 0.04% by weight to 0.3% by weight, for example in combination with carbon black in a concentration in the range from 0.01% by weight to 3% by weight, preferably in the range from 0.05% by weight to 1% by weight, and, for example, in combination with wax-based demolding agents in a concentration in the range from 0.01% by weight to 5% by weight, preferably in the range from 0.05% by weight to 2% by weight.

The compact thermoplastic or compact nonthermoplastic polyurethane may, in accordance with the invention, also be a cast elastomer.

The products of the present invention find use in many sectors, for instance the textile, sport and leisure industry, medicine, the automobile sector, or the mechanical engineering and toolmaking sector. Typical molded articles are cables, profiles, tubes, hoses, toothed belts, scrapers, hinges, lip seals, films, foils, parts of footwear, ski boot shells, snowboard boot shells, orthopedic articles, control cables, battery cables, trailing cables for electrical equipment, inlets for handling devices, fibers, elastic tapes, kickboard rolls, rollerskate shells, parts of mast adapters, ski tips and ends, rail underlays, conveyor rolls, guide rolls, seals.

Polyurethane elastomers in particular are used for seals, coupling elements, membranes, rolls and drive elements manufactured for industrial applications, or else textile fibers. Cast polyurethane elastomers are used, for example, for production of rolls, sieves, filters and industrial and sports floors.

Examples of possible applications also include PUR springs in mechanical engineering, compression strips and cutting strips in printing machines, wheel rims (tweels), wheels and rolls, sprockets for elastic couplings, metering rod beds, seals (solid and microcellular), pivot liners, dampers and buffers, sheathing of hoists and harnesses, fabric coating, coating of conveyor belts, impact protection elements, industrial edge protectors, pump elements and pump housings, outdoor pipe coatings, container linings, vehicle floor mats, pigs, cyclones, heavy-load rolls, deflection pulleys, guide pulleys, guide rolls and fixed rollers, idler pulleys, special coatings of conveyor belts, hydrolysis- and abrasion-resistant chute coatings, coatings on truck loading surfaces, fenders, clutch components, buoy coatings, inline skate wheels, special rollers, high-performance pump elements, sieves for abrasive bulk materials, scrapers and blade bars, transport stars and rolls, roll coating, floor protection mats for heavy construction machinery, casing components and coating of deburring drums. Further applications are mentioned, for example, in US 2014/170352 or US 2009/0076239.

In addition, the products of the present invention can be used as microfoams for breathable membranes for rainwear. They are likewise suitable for applications that require high wear resistance. For example in the transport of bulk goods through polyurethane hoses, or as protective coating in pipes and pipe bends, or else in prototype and specimen construction and in the foundry industry. Products made of polyurethane are used here to produce models and tools of many kinds, but also mass-produced parts.

In principle, the shaped bodies may be bodies of all possible shapes, for example extrusion products such as films and other shaped bodies (profiles, fibers, films), or injection-molded products.

The effect achieved in accordance with the invention occurs particularly distinctly in the case of prolonged cooling times as occur, for example, in the production of shaped bodies with relatively high wall thicknesses or with specific temperature control in the injection molding process. The compositions of the invention are thus particularly advantageous for production of shaped bodies having a particularly high layer thickness or wall thickness since it is specifically here that the inventive improvement in cycle times is important. In the context of the present invention, a high layer thickness or wall thickness is understood to mean, for example, a wall thickness of 4 mm or more, especially of 8 mm or more.

Further embodiments of the present invention are apparent from the claims and the examples. It will be appreciated that the features of the subject matter/processes/uses of the invention that are mentioned above and elucidated hereinafter can be used not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are detailed hereinafter, but these do not restrict the present invention. More particularly, the present invention also encompasses those embodiments that result from the dependency references and hence combinations that are specified hereinafter.

1. A process for producing a composition (I) at least comprising a compact thermoplastic polyurethane (P1), at least comprising the steps of
   (i) providing at least one compact thermoplastic polyurethane (P1) or a reaction mixture for production of a compact thermoplastic polyurethane (R-P1);
   (ii) adding at least one nucleating agent selected from the group consisting of quinacridones, monoazo compounds, perylenes, diketopyrrolopyrroles, isoindolines and phthalocyanines or derivatives of these compounds to the at least one thermoplastic polyurethane (P1) or to the reaction mixture for production of a compact thermoplastic polyurethane (R-P1);
   (iii) mixing the nucleating agent selected from the group consisting of quinacridones, monoazo compounds, perylenes, diketopyrrolopyrroles, isoindolines and phthalocyanines or derivatives of these compounds and the thermoplastic polyurethane (P1) or the reaction mixture (R-P1) to obtain a composition (I),
   wherein the amount of the sum total of the nucleating agents used, selected from the group consisting of quinacridones, monoazo compounds, perylenes, diketopyrrolopyrroles, isoindolines and phthalocyanines or derivatives of these compounds, is in the range from 0.01% by weight to 2.0% by weight, based on the thermoplastic polyurethane (P1) or the reaction mixture (R-P1).

2. The process according to embodiment 1, wherein the process comprises steps (iv) and (v):
   (iv) heating the composition (I) to a temperature in the region of the melting range of the thermoplastic polyurethane (P1) with at least partial melting of the thermoplastic polyurethane (P1);
   (v) cooling the composition.

3. The process according to embodiment 2, wherein the composition (I) in step (iv) is heated to a temperature in the region of the melting temperature of the hard phase or above the melting temperature of the hard phase of the thermoplastic polyurethane (P1).

4. The process according to any of embodiments 1 to 3, wherein the amount of the sum total of the nucleating agents used, selected from the group consisting of quinacridones, monoazo compounds, perylenes, diketopyrrolopyrroles, isoindolines and phthalocyanines or derivatives of these compounds, is in the range from 0.04% by weight to 0.3% by weight, based on the thermoplastic polyurethane (P1) or the reaction mixture (R-P1).

5. The process according to any of embodiments 1 to 4, wherein the nucleating agent is selected from the group consisting of quinacridones, diketopyrrolopyrroles and phthalocyanines or derivatives of these compounds.

6. The process according to any of embodiments 1 to 5, wherein a nucleating agent selected from the group consisting of quinacridones, monoazo compounds, perylenes, diketopyrrolopyrroles, isoindolines and phthalocyanines or derivatives of these compounds that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.

7. The process according to any of embodiments 1 to 6, wherein the nucleating agent is used in solid form with a specific surface area in the range from 10 $m^2/g$ to 150 $m^2/g$.

8. The process according to any of embodiments 1 to 6, wherein the nucleating agent is used in combination with a further additive.

9. A composition comprising at least one compact thermoplastic polyurethane and at least one nucleating agent selected from the group consisting of quinacridones, monoazo compounds, perylenes, diketopyrrolopyrroles, isoindolines and phthalocyanines or derivatives of these compounds, wherein the nucleating agent is present in the composition in an amount in the range from 0.04% to 0.1% by weight, based on the thermoplastic polyurethane.

10. A composition at least comprising a compact thermoplastic polyurethane and at least one nucleating agent selected from the group consisting of quinacridones, monoazo compounds, perylenes, diketopyrrolopyrroles, isoindolines and phthalocyanines or derivatives of these compounds, obtained or obtainable by a process according to any of embodiments 1 to 8.

11. The use of at least one compound selected from the group consisting of quinacridones, monoazo compounds, perylenes, diketopyrrolopyrroles, isoindolines and phthalocyanines or derivatives of these compounds as nucleating agent for a compact thermoplastic polyurethane, wherein the compound is used in an amount in the range from 0.01% to 2.0% by weight, based on the thermoplastic polyurethane.

12. The use of at least one nucleating agent selected from the group consisting of quinacridones, monoazo compounds, perylenes, diketopyrrolopyrroles, isoindolines and phthalocyanines or derivatives of these compounds for increasing the crystallization temperature $T_{cryst}$ of a compact thermoplastic polyurethane, wherein the nucleating agent is added to the thermoplastic polyurethane in an amount within a range from 0.01% to 2.0% by weight, based on the thermoplastic polyurethane.

13. A process for producing a composition (I) at least comprising a compact thermoplastic polyurethane (P1), at least comprising the steps of
   (i) providing at least one compact thermoplastic polyurethane (P1) or a reaction mixture for production of a compact thermoplastic polyurethane (R-P1);
   (ii) adding at least one nucleating agent selected from the group consisting of quinacridones, diketopyrrolopyrroles and phthalocyanines or derivatives of these compounds to the at least one thermoplastic polyurethane (P1) or to the reaction mixture for production of a compact thermoplastic polyurethane (R-P1);
   (iii) mixing nucleating agent selected from the group consisting of quinacridones, diketopyrrolopyrroles and phthalocyanines or derivatives of these compounds and the thermoplastic polyurethane (P1) or the reaction mixture (R-P1) to obtain a composition (I),
   wherein the amount of the sum total of the nucleating agents used, selected from the group consisting of quinacridones, diketopyrrolopyrroles and phthalocyanines or derivatives of these compounds, is in the range from 0.01% by weight to 2.0% by weight, based on the thermoplastic polyurethane (P1) or the reaction mixture (R-P1).

14. The process according to embodiment 13, wherein the process comprises steps (iv) and (v):
   (iv) heating the composition (I) to a temperature in the region of the melting range of a thermoplastic polyurethane (P1) with at least partial melting of the thermoplastic polyurethane (P1);
   (v) cooling the composition.

15. The process according to embodiment 14, wherein the composition (I) in step (iv) is heated to a temperature in the region of the melting temperature of the hard phase or above the melting temperature of the hard phase of the thermoplastic polyurethane (P1).

16. The process according to any of embodiments 13 to 15, wherein the amount of the sum total of the nucleating agents used, selected from the group consisting of quinacridones, diketopyrrolopyrroles and phthalocyanines or derivatives of these compounds, is in the range from 0.04% by weight to 0.3% by weight, based on the thermoplastic polyurethane (P1) or the reaction mixture (R-P1).

17. The process according to any of embodiments 13 to 16, wherein a nucleating agent selected from the group consisting of quinacridones, diketopyrrolopyrroles and phthalocyanines or derivatives of these compounds that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.

18. The process according to any of embodiments 13 to 17, wherein the nucleating agent is used in solid form with a specific surface area in the range from 10 m²/g to 150 m²/g.

19. The process according to any of embodiments 13 to 18, wherein the nucleating agent is used in combination with a further additive.

20. A composition comprising at least one compact thermoplastic polyurethane and at least one nucleating agent selected from the group consisting of quinacridones, diketopyrrolopyrroles and phthalocyanines or derivatives of these compounds, wherein the nucleating agent is present in the composition in an amount in the range from 0.04% to 0.1% by weight, based on the thermoplastic polyurethane.

21. A composition at least comprising a compact thermoplastic polyurethane and at least one nucleating agent selected from the group consisting of quinacridones, diketopyrrolopyrroles and phthalocyanines or derivatives of these compounds, obtained or obtainable by a process according to any of embodiments 13 to 19.

22. The use of at least one compound selected from the group consisting of quinacridones, diketopyrrolopyrroles and phthalocyanines or derivatives of these compounds as nucleating agent for a compact thermoplastic polyurethane, wherein the compound is used in an amount in the range from 0.01% to 2.0% by weight, based on the thermoplastic polyurethane.

23. The use of at least one nucleating agent selected from the group consisting of quinacridones, diketopyrrolopyrroles and phthalocyanines or derivatives of these compounds for increasing the crystallization temperature $T_{cryst}$ of a compact thermoplastic polyurethane, wherein the nucleating agent is added to the thermoplastic polyurethane in an amount within a range from 0.01% to 2.0% by weight, based on the thermoplastic polyurethane.

24. A process for producing a composition (I) at least comprising a compact thermoplastic polyurethane (P1), at least comprising the steps of
   (i) providing at least one compact thermoplastic polyurethane (P1) or a reaction mixture for production of a compact thermoplastic polyurethane (R-P1);
   (ii) adding at least one quinacridone derivative to the at least one thermoplastic polyurethane (P1) or to the reaction mixture for production of a compact thermoplastic polyurethane (R-P1);
   (iii) mixing the quinacridone derivative and the thermoplastic polyurethane (P1) or the reaction mixture (R-P1) to obtain a composition (I),
   wherein the amount of the sum total of the quinacridone derivative used is in the range from 0.01% by weight to 2.0% by weight, based on the thermoplastic polyurethane (P1) or the reaction mixture (R-P1).

25. A process for producing a composition (I) at least comprising a compact thermoplastic polyurethane (P1), at least comprising the steps of
   (i) providing at least one compact thermoplastic polyurethane (P1);
   (ii) adding at least one quinacridone derivative to the at least one thermoplastic polyurethane (P1);

(iii) mixing the quinacridone derivative and the thermoplastic polyurethane (P1) to obtain a composition (I),
wherein the amount of the sum total of the quinacridone derivative used is in the range from 0.01% by weight to 2.0% by weight, based on the thermoplastic polyurethane (P1).

26. A process for producing a composition (I) at least comprising a compact thermoplastic polyurethane (P1), at least comprising the steps of
   (i) providing at least one reaction mixture for production of a compact thermoplastic polyurethane (R-P1);
   (ii) adding at least one quinacridone derivative to the reaction mixture for production of a compact thermoplastic polyurethane (R-P1);
   (iii) mixing the quinacridone derivative and the reaction mixture (R-P1) to obtain a composition (I),
   wherein the amount of the sum total of the quinacridone derivative used is in the range from 0.01% by weight to 2.0% by weight, based on the reaction mixture (R-P1).

27. The process according to any of embodiments 24 to 26, wherein the process comprises steps (iv) and (v):
   (iv) heating the composition (I) to a temperature in the region of the melting range of the thermoplastic polyurethane (P1) with at least partial melting of the thermoplastic polyurethane (P1);
   (v) cooling the composition.

28. The process according to embodiment 27, wherein the composition (I) in step (iv) is heated to a temperature in the region of the melting temperature of the hard phase or above the melting temperature of the hard phase of the thermoplastic polyurethane (P1).

29. The process according to any of embodiments 24 to 28, wherein the amount of the sum total of the quinacridone derivatives used is in the range from 0.04% by weight to 0.3% by weight, based on the thermoplastic polyurethane (P1) or the reaction mixture (R-P1).

30. The process according to any of embodiments 24 to 29, wherein the quinacridone derivative is selected from the group consisting of quinacridone derivatives of the formula (I), dihydroquinacridone derivatives of the formula (II) and quinacridonequinone derivatives of the formula (III):

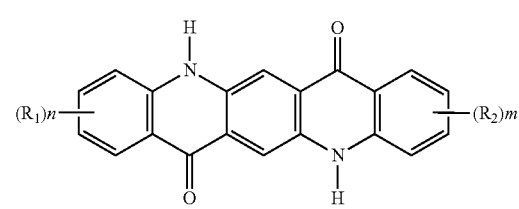

(I)

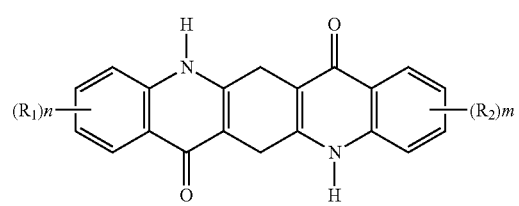

(II)

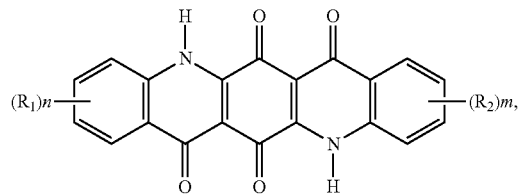

(III)

where $R_1$ and $R_2$ are independently selected from the group consisting of fluorine, chlorine, bromine, C1 to C6-alkyl or C1-C6-alkoxy, and n and m are independently an integer from 0 to 4.

31. The process according to any of embodiments 24 to 30, wherein the quinacridone derivative that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.

32. The process according to any of embodiments 24 to 31, wherein the quinacridone derivative is used in solid form with a specific surface area in the range from 10 m²/g to 150 m²/g.

33. The process according to any of embodiments 24 to 32, wherein the quinacridone derivative is used in combination with a further additive.

34. A composition comprising at least one compact thermoplastic polyurethane and at least one quinacridone derivative, wherein the quinacridone derivative is present in the composition in an amount in the range from 0.04% to 0.1% by weight, based on the thermoplastic polyurethane.

35. A composition at least comprising a compact thermoplastic polyurethane, obtained or obtainable by a process according to any of embodiments 24 to 33.

36. The use of at least one quinacridone derivative as nucleating agent for a compact thermoplastic polyurethane, wherein the quinacridone derivative is used in an amount in the range from 0.01% to 2.0% by weight, based on the thermoplastic polyurethane.

37. The use of at least one quinacridone derivative for increasing the crystallization temperature $T_{cryst}$ of a compact thermoplastic polyurethane, wherein the quinacridone derivative is added to the thermoplastic polyurethane in an amount in the range from 0.01% to 2.0% by weight, based on the thermoplastic polyurethane.

38. A process for producing a composition (I) at least comprising a compact thermoplastic polyurethane (P1), at least comprising the steps of
   (i) providing at least one compact thermoplastic polyurethane (P1) or a reaction mixture for production of a compact thermoplastic polyurethane (R-P1);
   (ii) adding at least one phthalocyanine derivative to the at least one thermoplastic polyurethane (P1) or to the reaction mixture for production of a compact thermoplastic polyurethane (R-P1);
   (iii) mixing the phthalocyanine derivative and the thermoplastic polyurethane (P1) or the reaction mixture (R-P1) to obtain a composition (I),
   wherein the amount of the sum total of the phthalocyanine derivative used is in the range from 0.01% by weight to 2.0% by weight, based on the thermoplastic polyurethane (P1) or the reaction mixture (R-P1).

39. A process for producing a composition (I) at least comprising a compact thermoplastic polyurethane (P1), at least comprising the steps of
   (i) providing at least one compact thermoplastic polyurethane (P1);
   (ii) adding at least one phthalocyanine derivative to the at least one thermoplastic polyurethane (P1);
   (iii) mixing the phthalocyanine derivative and the thermoplastic polyurethane (P1) to obtain a composition (I),
   wherein the amount of the sum total of the phthalocyanine derivative used is in the range from 0.01% by weight to 2.0% by weight, based on the thermoplastic polyurethane (P1).
40. A process for producing a composition (I) at least comprising a compact thermoplastic polyurethane (P1), at least comprising the steps of
   (i) providing at least one reaction mixture for production of a compact thermoplastic polyurethane (R-P1);
   (ii) adding at least one phthalocyanine derivative to the reaction mixture for production of a compact thermoplastic polyurethane (R-P1);
   (iii) mixing the phthalocyanine derivative and the reaction mixture (R-P1) to obtain a composition (I),
   wherein the amount of the sum total of the phthalocyanine derivative used is in the range from 0.01% by weight to 2.0% by weight, based on the reaction mixture (R-P1).
41. The process according to any of embodiments 38 to 40, wherein the process comprises steps (iv) and (v):
   (iv) heating the composition (I) to a temperature in the region of the melting range of a thermoplastic polyurethane (P1) with at least partial melting of the thermoplastic polyurethane (P1);
   (v) cooling the composition.
42. The process according to embodiment 41, wherein the composition (I) in step (iv) is heated to a temperature in the region of the melting temperature of the hard phase or above the melting temperature of the hard phase of the thermoplastic polyurethane (P1).
43. The process according to any of embodiments 38 to 42, wherein the amount of the sum total of the phthalocyanine derivatives used is in the range from 0.04% by weight to 0.3% by weight, based on the thermoplastic polyurethane (P1) or the reaction mixture (R-P1).
44. The process according to any of embodiments 38 to 43, wherein the phthalocyanine derivative is selected from the group consisting of aluminum phthalocyanine, nickel phthalocyanine, cobalt phthalocyanine, iron phthalocyanine, zinc phthalocyanine, copper phthalocyanine, polychloro copper phthalocyanine, hexadecachlorophthalocyanine, hexadecabromophthalocyanine and manganese phthalocyanine and derivatives thereof.
45. The process according to any of embodiments 38 to 44, wherein the phthalocyanine derivative that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.
46. The process according to any of embodiments 38 to 45, wherein the phthalocyanine derivative is used in solid form with a specific surface area in the range from 10 m$^2$/g to 150 m$^2$/g.
47. The process according to any of embodiments 38 to 46, wherein the phthalocyanine derivative is used in combination with a further additive.
48. A composition comprising at least one compact thermoplastic polyurethane and at least one phthalocyanine derivative, wherein the phthalocyanine derivative is present in the composition in an amount in the range from 0.04% to 0.1% by weight, based on the thermoplastic polyurethane.
49. A composition at least comprising a compact thermoplastic polyurethane and at least one phthalocyanine derivative, obtained or obtainable by a process according to any of embodiments 38 to 47.
50. The use of at least one phthalocyanine derivative as nucleating agent for a compact thermoplastic polyurethane, wherein the phthalocyanine derivative is used in an amount in the range from 0.01% to 2.0% by weight, based on the thermoplastic polyurethane.
51. The use of at least one phthalocyanine derivative for increasing the crystallization temperature $T_{cryst}$ of a compact thermoplastic polyurethane, wherein the phthalocyanine derivative is added to the thermoplastic polyurethane in an amount in the range from 0.01% to 2.0% by weight, based on the thermoplastic polyurethane.
52. A process for producing a composition (I) at least comprising a compact thermoplastic polyurethane (P1), at least comprising the steps of
   (i) providing at least one compact thermoplastic polyurethane (P1) or a reaction mixture for production of a compact thermoplastic polyurethane (R-P1);
   (ii) adding at least one isoindoline derivative to the at least one thermoplastic polyurethane (P1) or to the reaction mixture for production of a compact thermoplastic polyurethane (R-P1);
   (iii) mixing the isoindoline derivative and the thermoplastic polyurethane (P1) or the reaction mixture (R-P1) to obtain a composition (I),
   wherein the amount of the sum total of the isoindoline derivative used is in the range from 0.01% by weight to 2.0% by weight, based on the thermoplastic polyurethane (P1) or the reaction mixture (R-P1).
53. The process according to embodiment 52, wherein the process comprises steps (iv) and (v):
   (iv) heating the composition (I) to a temperature in the region of the melting range of a thermoplastic polyurethane (P1) with at least partial melting of the thermoplastic polyurethane (P1);
   (v) cooling the composition.
54. The process according to embodiment 53, wherein the composition (I) in step (iv) is heated to a temperature in the region of the melting temperature of the hard phase or above the melting temperature of the hard phase of the thermoplastic polyurethane (P1).
55. The process according to any of embodiments 52 to 54, wherein the amount of the sum total of the isoindoline derivatives used is in the range from 0.04% by weight to 0.3% by weight, based on the thermoplastic polyurethane (P1) or the reaction mixture (R-P1).
56. The process according to any of embodiments 52 to 55, wherein the isoindoline derivative that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.
57. The process according to any of embodiments 52 to 56, wherein the isoindoline derivative is used in solid form with a specific surface area in the range from 10 m$^2$/g to 150 m$^2$/g.

58. The process according to any of embodiments 52 to 57, wherein the isoindoline derivative is used in combination with a further additive.

59. A composition comprising at least one compact thermoplastic polyurethane and at least one isoindoline derivative, wherein the isoindoline derivative is present in the composition in an amount in the range from 0.04% to 0.1% by weight, based on the thermoplastic polyurethane.

60. A composition at least comprising a compact thermoplastic polyurethane and at least one isoindoline derivative, obtained or obtainable by a process according to any of embodiments 52 to 58.

61. The use of at least one isoindoline derivative as nucleating agent for a compact thermoplastic polyurethane, wherein the isoindoline derivative is used in an amount in the range from 0.01% to 2.0% by weight, based on the thermoplastic polyurethane.

62. The use of at least one isoindoline derivative for increasing the crystallization temperature $T_{cryst}$ of a compact thermoplastic polyurethane, wherein the isoindoline derivative is added to the thermoplastic polyurethane in an amount in the range from 0.01% to 2.0% by weight, based on the thermoplastic polyurethane.

63. A process for producing a composition (I) at least comprising a compact thermoplastic polyurethane (P1), at least comprising the steps of
   (i) providing at least one compact thermoplastic polyurethane (P1) or a reaction mixture for production of a compact thermoplastic polyurethane (R-P1);
   (ii) adding at least one diketopyrrolopyrrole derivative to the at least one thermoplastic polyurethane (P1) or to the reaction mixture for production of a compact thermoplastic polyurethane (R-P1);
   (iii) mixing the diketopyrrolopyrrole derivative and the thermoplastic polyurethane (P1) or the reaction mixture (R-P1) to obtain a composition (I),
   wherein the amount of the sum total of the diketopyrrolopyrrole derivative used is in the range from 0.01% by weight to 2.0% by weight, based on the thermoplastic polyurethane (P1) or the reaction mixture (R-P1).

64. A process for producing a composition (I) at least comprising a compact thermoplastic polyurethane (P1), at least comprising the steps of
   (i) providing at least one compact thermoplastic polyurethane (P1);
   (ii) adding at least one diketopyrrolopyrrole derivative to the at least one thermoplastic polyurethane (P1);
   (iii) mixing the diketopyrrolopyrrole derivative and the thermoplastic polyurethane (P1) to obtain a composition (I),
   wherein the amount of the sum total of the diketopyrrolopyrrole derivative used is in the range from 0.01% by weight to 2.0% by weight, based on the thermoplastic polyurethane (P1).

65. A process for producing a composition (I) at least comprising a compact thermoplastic polyurethane (P1), at least comprising the steps of
   (i) providing at least one reaction mixture for production of a compact thermoplastic polyurethane (R-P1);
   (ii) adding at least one diketopyrrolopyrrole derivative to the reaction mixture for production of a compact thermoplastic polyurethane (R-P1);
   (iii) mixing the diketopyrrolopyrrole derivative and the reaction mixture (R-P1) to obtain a composition (I),
   wherein the amount of the sum total of the diketopyrrolopyrrole derivative used is in the range from 0.01% by weight to 2.0% by weight, based on the reaction mixture (R-P1).

66. The process according to any of embodiments 63 to 65, wherein the process comprises steps (iv) and (v):
   (iv) heating the composition (I) to a temperature in the region of the melting range of the thermoplastic polyurethane (P1) with at least partial melting of the thermoplastic polyurethane (P1);
   (v) cooling the composition.

67. The process according to embodiment 66, wherein the composition (I) in step (iv) is heated to a temperature in the region of the melting temperature of the hard phase or above the melting temperature of the hard phase of the thermoplastic polyurethane (P1).

68. The process according to any of embodiments 63 to 67, wherein the amount of the sum total of the diketopyrrolopyrrole derivatives used is in the range from 0.04% by weight to 0.3% by weight, based on the thermoplastic polyurethane (P1) or the reaction mixture (R-P1).

69. The process according to any of embodiments 63 to 68, wherein the diketopyrrolopyrrole derivative is selected from the group consisting of diketopyrrolopyrrole derivatives of the formula (IV):

where R1 and R2 are independently selected from the groups consisting of hydrogen, $C_1$-$C_{18}$-alkyl, $C_1$-$C_4$-alkoxy, phenyl, cyano or halogen and R3 and R4 are also independently selected from the groups consisting of hydrogen, $C_1$-$C_{18}$-alkyl, $C_3$-$C_{12}$-alkenyl, $C_3$-$C_5$-alkynyl, $C_2$-$C_5$-alkoxycarbonyl, carbamoyl, $C_2$-$C_{13}$-alkyl, $C_1$-$C_4$-alkoxycarbonyl, phenyl or phenyl substituted by chlorine, bromine, $C_1$-$C_4$-alkyl, $C_1$-$C_4$-alkoxy, trifluoromethyl or nitro.

70. The process according to any of embodiments 63 to 69, wherein the diketopyrrolopyrrole derivative that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.

71. The process according to any of embodiments 63 to 70, wherein the diketopyrrolopyrrole derivative is used in solid form with a specific surface area in the range from 10 m$^2$/g to 150 m$^2$/g, preferably above 50 m$^2$/g.

72. The process according to any of embodiments 63 to 71, wherein the diketopyrrolopyrrole derivative is used in combination with a further additive.

73. A composition comprising at least one compact thermoplastic polyurethane and at least one diketopyrrolopyrrole derivative, wherein the diketopyrrolopyrrole derivative is present in the composition in an amount in the range from 0.04% to 0.2% by weight, based on the thermoplastic polyurethane.

74. A composition at least comprising a compact thermoplastic polyurethane and at least one diketopyrrolopyrrole derivative, obtained or obtainable by a process according to any of embodiments 63 to 72.

75. The use of at least one diketopyrrolopyrrole derivative as nucleating agent for a compact thermoplastic polyurethane, wherein the diketopyrrolopyrrole derivative is used in an amount in the range from 0.01% to 2.0% by weight, based on the thermoplastic polyurethane.

76. The use of at least one diketopyrrolopyrrole derivative for increasing the crystallization temperature $T_{cryst}$ of a compact thermoplastic polyurethane, wherein the diketopyrrolopyrrole derivative is added to the thermoplastic polyurethane in an amount in the range from 0.01% to 2.0% by weight, based on the thermoplastic polyurethane.

77. A process for producing a composition (I) at least comprising a compact thermoplastic polyurethane (P1), at least comprising the steps of
 (i) providing at least one compact thermoplastic polyurethane (P1) or a reaction mixture for production of a compact thermoplastic polyurethane (R-P1);
 (ii) adding at least one perylene derivative to the at least one thermoplastic polyurethane (P1) or to the reaction mixture for production of a compact thermoplastic polyurethane (R-P1);
 (iii) mixing the perylene derivative and the thermoplastic polyurethane (P1) or the reaction mixture (R-P1) to obtain a composition (I),
 wherein the amount of the sum total of the perylene derivative used is in the range from 0.01% by weight to 2.0% by weight, based on the thermoplastic polyurethane (P1) or the reaction mixture (R-P1).

78. A process for producing a composition (I) at least comprising a compact thermoplastic polyurethane (P1), at least comprising the steps of
 (i) providing at least one compact thermoplastic polyurethane (P1);
 (ii) adding at least one perylene derivative to the at least one thermoplastic polyurethane (P1);
 (iii) mixing the perylene derivative and the thermoplastic polyurethane (P1) to obtain a composition (I),
 wherein the amount of the sum total of the perylene derivative used is in the range from 0.01% by weight to 2.0% by weight, based on the thermoplastic polyurethane (P1).

79. A process for producing a composition (I) at least comprising a compact thermoplastic polyurethane (P1), at least comprising the steps of
 (i) providing at least one reaction mixture for production of a compact thermoplastic polyurethane (R-P1);
 (ii) adding at least one perylene derivative to the reaction mixture for production of a compact thermoplastic polyurethane (R-P1);
 (iii) mixing the perylene derivative and the reaction mixture (R-P1) to obtain a composition (I),
 wherein the amount of the sum total of the perylene derivative used is in the range from 0.01% by weight to 2.0% by weight, based on the reaction mixture (R-P1).

80. The process according to any of embodiments 77 to 79, wherein the process comprises steps (iv) and (v):
 (iv) heating the composition (I) to a temperature in the region of the melting range of a thermoplastic polyurethane (P1) with at least partial melting of the thermoplastic polyurethane (P1);
 (v) cooling the composition.

81. The process according to embodiment 80, wherein the composition (I) in step (iv) is heated to a temperature in the region of the melting temperature of the hard phase or above the melting temperature of the hard phase of the thermoplastic polyurethane (P1).

82. The process according to any of embodiments 77 to 81, wherein the amount of the sum total of the perylene derivatives used is in the range from 0.04% by weight to 0.3% by weight, based on the thermoplastic polyurethane (P1) or the reaction mixture (R-P1).

83. The process according to any of embodiments 77 to 82, wherein the perylene derivative that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.

84. The process according to any of embodiments 77 to 83, wherein the perylene derivative is used in solid form with a specific surface area in the range from 10 $m^2$/g to 150 $m^2$/g.

85. The process according to any of embodiments 77 to 84, wherein the perylene derivative is used in combination with a further additive.

86. A composition comprising at least one compact thermoplastic polyurethane and at least one perylene derivative, wherein the perylene derivative is present in the composition in an amount in the range from 0.04% to 0.1% by weight, based on the thermoplastic polyurethane.

87. A composition at least comprising a compact thermoplastic polyurethane and at least one perylene derivative, obtained or obtainable by a process according to any of embodiments 77 to 85.

88. The use of at least one perylene derivative as nucleating agent for a compact thermoplastic polyurethane, wherein the perylene derivative is used in an amount in the range from 0.01% to 2.0% by weight, based on the thermoplastic polyurethane.

89. The use of at least one perylene derivative for increasing the crystallization temperature $T_{cryst}$ of a compact thermoplastic polyurethane, wherein the perylene derivative is added to the thermoplastic polyurethane in an amount in the range from 0.01% to 2.0% by weight, based on the thermoplastic polyurethane.

90. A process for producing a composition (I) at least comprising a compact thermoplastic polyurethane (P1), at least comprising the steps of
 (i) providing at least one compact thermoplastic polyurethane (P1) or a reaction mixture for production of a compact thermoplastic polyurethane (R-P1);
 (ii) adding at least one monoazo derivative to the at least one thermoplastic polyurethane (P1) or to the reaction mixture for production of a compact thermoplastic polyurethane (R-P1);
 (iii) mixing the monoazo derivative and the thermoplastic polyurethane (P1) or the reaction mixture (R-P1) to obtain a composition (I),
 wherein the amount of the sum total of the monoazo derivative used is in the range from 0.01% by weight to 2.0% by weight, based on the thermoplastic polyurethane (P1) or the reaction mixture (R-P1).
91. A process for producing a composition (I) at least comprising a compact thermoplastic polyurethane (P1), at least comprising the steps of
    (i) providing at least one compact thermoplastic polyurethane (P1);
    (ii) adding at least one monoazo derivative to the at least one thermoplastic polyurethane (P1);
    (iii) mixing the monoazo derivative and the thermoplastic polyurethane (P1) to obtain a composition (I),
    wherein the amount of the sum total of the monoazo derivative used is in the range from 0.01% by weight to 2.0% by weight, based on the thermoplastic polyurethane (P1).
92. A process for producing a composition (I) at least comprising a compact thermoplastic polyurethane (P1), at least comprising the steps of
    (i) providing at least one reaction mixture for production of a compact thermoplastic polyurethane (R-P1);
    (ii) adding at least one monoazo derivative to the reaction mixture for production of a compact thermoplastic polyurethane (R-P1);
    (iii) mixing the monoazo derivative and the reaction mixture (R-P1) to obtain a composition (I),
    wherein the amount of the sum total of the monoazo derivative used is in the range from 0.01% by weight to 2.0% by weight, based on the reaction mixture (R-P1).
93. The process according to any of embodiments 90 to 92, wherein the process comprises steps (iv) and (v):
    (iv) heating the composition (I) to a temperature in the region of the melting range of a thermoplastic polyurethane (P1) with at least partial melting of the thermoplastic polyurethane (P1);
    (v) cooling the composition.
94. The process according to embodiment 93, wherein the composition (I) in step (iv) is heated to a temperature in the region of the melting temperature of the hard phase or above the melting temperature of the hard phase of the thermoplastic polyurethane (P1).
95. The process according to any of embodiments 90 to 94, wherein the amount of the sum total of the monoazo derivatives used is in the range from 0.04% by weight to 0.3% by weight, based on the thermoplastic polyurethane (P1) or the reaction mixture (R-P1).
96. The process according to any of embodiments 90 to 95, wherein the monoazo derivative that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.
97. The process according to any of embodiments 90 to 96, wherein the monoazo derivative is used in solid form with a specific surface area in the range from 10 m²/g to 150 m²/g.
98. The process according to any of embodiments 90 to 97, wherein the monoazo derivative is used in combination with a further additive.
99. A composition comprising at least one compact thermoplastic polyurethane and at least one monoazo derivative, wherein the monoazo derivative is present in the composition in an amount in the range from 0.04% to 0.1% by weight, based on the thermoplastic polyurethane.
100. A composition at least comprising a compact thermoplastic polyurethane and at least one monoazo derivative, obtained or obtainable by a process according to any of embodiments 90 to 98.
101. The use of at least one monoazo derivative as nucleating agent for a compact thermoplastic polyurethane, wherein the monoazo derivative is used in an amount in the range from 0.01% to 2.0% by weight, based on the thermoplastic polyurethane.
102. The use of at least one monoazo derivative for increasing the crystallization temperature $T_{cryst}$ of a compact thermoplastic polyurethane, wherein the monoazo derivative is added to the thermoplastic polyurethane in an amount in the range from 0.01% to 2.0% by weight, based on the thermoplastic polyurethane.
103. A process for producing a composition (I) at least comprising a compact thermoplastic polyurethane (P1), at least comprising the steps of
    (i) providing at least one compact thermoplastic polyurethane (P1) or a reaction mixture for production of a compact thermoplastic polyurethane (R-P1);
    (ii) adding at least one compound (N) that has a conjugated, nitrogen-containing aromatic structure as nucleating agent to the at least one thermoplastic polyurethane (P1) or to the reaction mixture for production of a compact thermoplastic polyurethane (R-P1), wherein the compound (N) is a solid;
    (iii) mixing the nucleating agent and the thermoplastic polyurethane (P1) or the reaction mixture (R-P1) to obtain a composition (I),
    wherein the amount of the sum total of the nucleating agents used is in the range from 0.01% by weight to 2.0% by weight, based on the thermoplastic polyurethane (P1) or the reaction mixture (R-P1).
104. The process according to embodiment 103, wherein the process comprises steps (iv) and (v):
    (iv) heating the composition (I) to a temperature in the region of the melting range of the thermoplastic polyurethane (P1) with at least partial melting of the thermoplastic polyurethane (P1);
    (v) cooling the composition.
105. The process according to embodiment 104, wherein the composition (I) in step (iv) is heated to a temperature in the region of the melting temperature of the hard phase or above the melting temperature of the hard phase of the thermoplastic polyurethane (P1).
106. The process according to any of embodiments 103 to 105, wherein the amount of the sum total of the nucleating agents used is in the range from 0.04% by weight to 0.3% by weight, based on the thermoplastic polyurethane (P1) or the reaction mixture (R-P1).
107. The process according to any of embodiments 103 to 106, wherein the nucleating agent is selected from the group consisting of quinacridones, monoazo compounds, perylenes, diketopyrrolopyrroles, isoindolines and phthalocyanines or derivatives of these compounds.
108. The process according to any of embodiments 103 to 107, wherein the nucleating agent is selected from the group consisting of quinacridones, diketopyrrolopyrroles and phthalocyanines or derivatives of these compounds.
109. The process according to any of embodiments 103 to 108, wherein a nucleating agent that has been subjected to a treatment comprising grinding, treatment with a solvent, acids, alkalis, bleaches, crystallization or extraction, and finishing operations to reduce or prevent flocculation or lump formation, finishing operations to control the particle size, or finishing operations to regulate the viscosity is used.

110. The process according to any of embodiments 103 to 109, wherein the nucleating agent is used in solid form with a specific surface area in the range from 10 m²/g to 150 m²/g.

111. The process according to any of embodiments 103 to 110, wherein the nucleating agent is used in combination with a further additive.

112. A composition comprising at least one compact thermoplastic polyurethane and at least one compound (N) having a conjugated, nitrogen-containing aromatic structure as nucleating agent, wherein the compound (N) is a solid and the nucleating agent is present in the composition in an amount within a range from 0.04% to 0.1% by weight, based on the thermoplastic polyurethane.

113. The composition according to embodiment 112, wherein the nucleating agent is selected from the group consisting of quinacridones, monoazo compounds, perylenes, diketopyrrolopyrroles, isoindolines and phthalocyanines or derivatives of these compounds.

114. A composition at least comprising a compact thermoplastic polyurethane and at least one nucleating agent, obtained or obtainable by a process according to any of embodiments 103 to 113.

115. The use of at least one compound (N) having a conjugated, nitrogen-containing aromatic structure as nucleating agent for a compact thermoplastic polyurethane, wherein the compound (N) is a solid and the nucleating agent is used in an amount in the range from 0.01% to 2.0% by weight, based on the thermoplastic polyurethane.

116. The use according to embodiment 115, wherein the nucleating agent is selected from the group consisting of quinacridones, monoazo compounds, perylenes, diketopyrrolopyrroles, isoindolines and phthalocyanines or derivatives of these compounds.

117. The use of at least one compound (N) having a conjugated, nitrogen-containing aromatic structure for increasing the crystallization temperature $T_{cryst}$ of a compact thermoplastic polyurethane, wherein the compound (N) is a solid and is added to the thermoplastic polyurethane in an amount of 0.01% to 2.0% by weight, based on the thermoplastic polyurethane.

118. The use according to embodiment 117, wherein the compound (N) is selected from the group consisting of quinacridones, monoazo compounds, perylenes, diketopyrrolopyrroles, isoindolines and phthalocyanines or derivatives of these compounds.

The examples which follow serve to illustrate the invention, but are in no way restrictive with respect to the subject matter of the present invention.

EXAMPLES

1. TPU Production Example 1.1 Feedstocks:

Polyol 1: polyether polyol having an OH number of 112.2 and exclusively primary OH groups (based on tetramethylene oxide, functionality: 2)

Polyol 2: polyester polyol having an OH number of 56 and exclusively primary OH groups (based on hexanediol, butanediol, adipic acid, functionality: 2)

Polyol 4: polyester polyol having an OH number of 46 and exclusively primary OH groups (based on adipic acid and butanediol, functionality: 2)

Polyol 5: polyester polyol having an OH number of 112 and exclusively primary OH groups (based on adipic acid and butanediol, functionality: 2)

Polyol 6: polyester polyol having an OH number of 56 and exclusively primary OH groups (based on ε-caprolactone and neopentyl glycol)

Polyol 7: polyether polyol having an OH number of 56 and exclusively primary OH groups (based on tetramethylene oxide, functionality: 2) (PTHF 2000)

Polyol 8: polyester polyol having an OH number of 55 and exclusively primary OH groups (based on adipic acid and butanediol, functionality: 2)

Polyol 9: polyether polyol having an OH number of 248 and exclusively secondary OH groups (based on propylene glycol, functionality: 2)

Polyol 10: polyether polyol having an OH number of 55 and exclusively secondary OH groups (based on propylene glycol, functionality: 2)

Isocyanate 1: aromatic isocyanate (methylene diphenyl 4,4'-diisocyanate)

Isocyanate 2: aliphatic isocyanate (hexamethylene 4,4'-diisocyanate)

Isocyanate 3: aliphatic isocyanate (hexamethylene 1,6-diisocyanate)

Isocyanate 4: aromatic isocyanate (naphthylene 1,5-diisocyanate)

Isocyanate 5 prepolymer based on 86.9% methylene diphenyl 4,4'-diisocyanate, 8.2% dipropylene glycol and 4.9% polypropylene glycol (Mn=450 g/mol, OH functionality of 2, polyol 9) having a residual NCO content of 22.9%

Isocyanate 6 prepolymer based on 37.8% methylene diphenyl 4,4'-diisocyanate and 62.2% polytetrahydrofuran (Mn=2000 g/mol, OH functionality of 2) and a residual NCO content of 10%

Chain extender 1 (CE 1): propane-1,3-diol

Chain extender 2 (CE 2): butane-1,4-diol

Chain extender 3 (CE 3): hexane-1,6-diol

Chain extender 4 (CE 4): hydroquinone bis(2-hydroxyethyl) ether (HQEE)

Chain extender 5 (CE 5): ethane-1,2-diol

Catalyst 1: tin(II) isooctoate (50% in dioctyl adipate)

Catalyst 2: 1,4-diazabicydo[2.2.2]octane 33% in dipropylene glycol

Catalyst 3: 2% of a 19% solution of zinc neodecanoate and 0.5% of a 16% bismuth neodecanoate solution in polyol 10

Catalyst 4: 5% Polycat SA 1/10 consisting of DBU and phenol (1:1 molar) in polyol 10

Catalyst 5: 33% solution of triethylenediamine dissolved in dipropylene glycol

Stabilizer 1: sterically hindered phenol

Stabilizer 2: polymeric carbodiimide

Additive 1: ester wax

Additive 2: silicone-containing antifoam

Additive 3: fatty acid-based oil as demolding aid

Additive 4: K—Ca—Na zeolite A in castor oil

Demolding aid 1: a masterbatch consisting of amide wax, diatomaceous earth and silica and a TPU with Shore 80 A and an MFR of 20-50 g/10 min (determined at 190° C. and 21.6 kg)

Nucleating agent 1: 2,9-dimethylquinacridone

Nucleating agent 2: quinacridonequinone

Nucleating agent 3: 2,9-dichloroquinacridone

Nucleating agent 4: beta-quinacridone, C.I. Pigment Violet 19

Nucleating agent 5: gamma-quinacridone, phthalimide treatment, C.I. Pigment Violet 19

Nucleating agent 6: gamma-quinacridone, ground acid extraction, C.I. Pigment Violet 19

Nucleating agent 7: gamma-quinacridone, ground bleached phthalimide treatment, C.I. Pigment Violet 19

Nucleating agent 8: solid solution of gamma-quinacridone and 2,9-dichloroquinacridone (ratio 1:9), acid extraction, plus acid treatment and dimethylimidazole treatment Nucleating agent 9: solid solution of gamma-quinacridone and 2,9-dichloroquinacridone (ratio 1:3), acid extraction, neutralized Nucleating agent 10: solid solution of gamma-quinacridone and 2,9-dichloroquinacridone (ratio 1:3), acid extraction, plus acid treatment, C.I. Pigment Red 202

Nucleating agent 11: solid solution of gamma-quinacridone and 2,9-dichloroquinacridone (ratio 1:9), acid extraction plus acid treatment, C.I. Pigment Red 202

Nucleating agent 12: 2,9-dichloroquinacridone, ground, acid extraction, C.I. Pigment Red 202

Nucleating agent 13: solid solution of gamma-quinacridone and 2,9-dimethylquinacridone (ratio 1:3), acid treatment, C.I. Pigment Violet 42

Nucleating agent 14: solid solution of gamma-quinacridone and 2,9-dimethylquinacridone (ratio 1:3), C.I. Pigment Red 122

Nucleating agent 15: solid solution of quinacridonequinone and gamma-quinacridone, C.I. Pigment Orange 48

Nucleating agent 25: diketopyrrolopyrrole derivative, C.I. Pigment rot 264

Nucleating agent 26: diketopyrrolopyrrole derivative, C.I. Pigment orange 71

Nucleating agent 27: dichlorodiketopyrrolopyrrole derivative, with fine particle size Nucleating agent 28: nucleating agent 27, but with coarser particle size distribution Nucleating agent 29: dichlorodiketopyrrolopyrrole derivative, with very fine particle size Nucleating agent 30: diketopyrrolopyrrole derivative, C.I. Pigment orange 73

Nucleating agent 31: pyrrolopyrrole derivative, C.I. Pigment red 272

Nucleating agent 32: monoazo salt, C.I. Pigment Yellow 168

Nucleating agent 33: perylene, C.I. Pigment Red 149

Nucleating agent 34: perylene, C.I. Pigment Violet 29

Nucleating agent 35: Cu phthalocyanine pigment, C.I. Pigment Blue 15:4

Nucleating agent 36: isoindoline, C.I. Pigment Yellow 139

Nucleating agent 37: perylene, C.I. Pigment Red 178

Nucleating agent 38: perylene, C.I. Pigment Red 179

Nucleating agent 39: isoindolinone, C.I. Pigment Yellow 110

Nucleating agent 40: benzimidazolone, C.I. Pigment Yellow 151

Nucleating agent 41: hydrogenated form of 2,9-dichloroquinacridone

Structure:

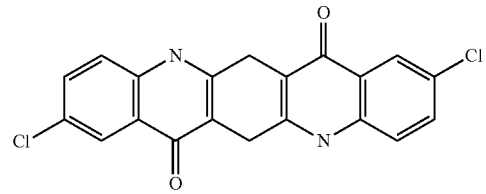 [SMILES: O=c1c2c([nH]c3ccc(Cl)cc13)Cc1c([nH]c3ccc(Cl)cc3c1=O)C2]

Nucleating agent 42: hydrogenated form of gamma-quinacridone

Structure:

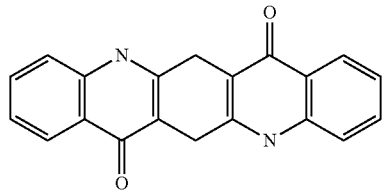 [SMILES: O=c1c2c([nH]c3ccccc13)Cc1c([nH]c3ccccc3c1=O)C2]

C.I. means Colour Index 1.2 General Production Example for Batchwise Synthesis

A thermoplastic polyurethane (TPU) was synthesized from isocyanate, chain extender, stabilizer, catalyst and polyol while stirring in a reaction vessel. The polyol, the chain extender, stabilizer and catalyst were initially charged in a vessel at 80° C. and mixed with the isocyanate that had been preheated to 48° C. with vigorous stirring. On attainment of a reaction temperature of 110° C., the solution was poured out onto a hotplate heated to 125° C., and the TPU slab obtained, after heat treatment (15 hours at 80° C.), was pelletized and processed by injection molding.

The synthesis and properties of thermoplastic polyurethanes that were produced by batchwise synthesis are summarized in tables 1 to 3.

TABLE 1

| Feedstock | Synthesis examples | | | | | | |
| --- | --- | --- | --- | --- | --- | --- | --- |
| | Example 1 | Example 2 | Example 3 | Example 4 | Example 5 | Example 6 | Example 7 |
| Polyol 1 [g] | | | | | | 1000 | 1000 |
| Polyol 6 [g] | 1000 | 1000 | 1000 | 1000 | 1000 | | |
| Isocyanate 1 [g] | 658 | 523.24 | 611.15 | 697.12 | | 630 | 647.4 |
| Isocyanate 2 [g] | | | | | 824.4 | | |
| CE 1 [g] | | | | | | | 119.5 |
| CE 2 [g] | 188.06 | | | | 236.71 | 135.2 | |
| CE 3 [g] | | | 225.97 | | | | |
| CE 4 [g] | | 306.9 | | | | | |

TABLE 1-continued

Synthesis examples

| Feedstock | Example 1 | Example 2 | Example 3 | Example 4 | Example 5 | Example 6 | Example 7 |
|---|---|---|---|---|---|---|---|
| CE 5 [g] | | | | 146.7 | | | |
| Stabilizer 2 [g] | 15 | 15 | 15 | 15 | 8 | | |
| Cat 1 [ppm] | | | | | 400 | | |
| Index | 1000 | 1000 | 1000 | 1000 | 1000 | 1000 | 1000 |

TABLE 2

Synthesis examples

| Feedstock | Example 8 | Example 9 | Example 12 | Example 13 | Example 14 | Example 15 | Example 16 |
|---|---|---|---|---|---|---|---|
| Polyol 1 [g] | 1000 | | | | 1000 | 1000 | 1000 |
| Polyol 5 [g] | | 1000 | | | | | |
| Polyol 2 [g] | | | 1000 | | | | |
| Polyol 4 [g] | | | | 1000 | | | |
| Isocyanate 1 [g] | 630 | 670 | 700 | 600 | 920 | | |
| Isocyanate 3 [g] | | | | | | 1197 | |
| Isocyanate 2 [g] | | | | | | | 1203 |
| CE 1 [g] | | | | | 204 | | |
| CE 2 [g] | 136.74 | 149.73 | 205.26 | 177.66 | | | 323 |
| CE 3 [g] | | | | | | 723 | |
| Catalyst 1 | | | | | | 45 | 150 |
| Stabilizer 1 [g] | 17.85 | 8 | 10 | 8 | 21.5 | 14.7 | 12.9 |
| Additive 1 [g] | | | 1 | | | | 5 |

In the case of example 18, the diisocyanate that had been preheated to 48° C. was added to the remaining components that had been preheated to 60° C. On attainment of a reaction temperature of 80° C., the solution was poured out onto a hotplate heated to 80° C., and the TPU slab obtained was processed further as described above.

TABLE 3

Synthesis examples

| Feedstock | Example 17 | Example 18 | Example 19 | Example 29 | Example 30 | Example 31 |
|---|---|---|---|---|---|---|
| Polyol 1 [g] | 750 | 573.6 | | | 500 | 600 |
| Polyol 2 [g] | | | 750 | | | |
| Polyol 4 [g] | | | | 1000 | | |
| Polyol 7 [g] | | | | | 500 | |
| Isocyanate 1 [g] | 690 | 344.2 | 585 | 393.77 | 372 | 717.71 |
| CE 2 [g] | 180.1 | 72.2 | 175.76 | 102.85 | 66.42 | 204.40 |
| Catalyst 1 [ppm] | | | 20 | | | |
| Stabilizer 1 [g] | | 10 | | | 14.53 | 7.65 |
| Stabilizer 2 [g] | | | | 8 | | |
| Index | 1000 | | 990 | 1000 | 1000 | 1000 |

1.3 General Example for Continuous Synthesis

A mixture of isocyanate, chain extender, a stabilizer and polyol having an average molar mass of 1 kg/mol was heated to 80° C. and mixed vigorously in a mixing head. The reaction mixture obtained was applied to a circulating PTFE belt at a temperature of 112° C. The reaction mixture that had solidified to form a solid strip material (slab) at the end of the belt was fed continuously at about 80° C. via intake rolls directly to a comminution and homogenization apparatus. It was comminuted therein at temperatures of about 105° C. and conveyed to a single-shaft extruder connected thereto by a tangential flange. The housing temperatures were about 170° C. to 190° C. in the intake region, and 210 to 230° C. in the middle zone. The melt that exited at the die plate was processed by means of underwater pelletization to give homogeneous lenticular pellets and then dried.

The synthesis and properties of thermoplastic polyurethanes that were produced by continuous synthesis are summarized in table 4 and table 5.

TABLE 4

Synthesis examples:

| | Example 8 | Example 9 | Example 10 | Example 11 | Example 12 |
|---|---|---|---|---|---|
| Polyol 1 [g] | 1000 | | | 1000 | |
| Polyol 2 [g] | | | | | 1000 |
| Polyol 4 [g] | | | 1000 | | |
| Polyol 5 [g] | | 1000 | | | |
| Isocyanate 1 [g] | 630 | 670 | 556.96 | 1100 | 700 |
| CE 2 [g] | 136.74 | 149.73 | 159.7 | 306 | 205.6 |
| Stabilizer 1 [g] | 17.85 | | | 12 | |
| Stabilizer 2 [g] | | 8 | 8 | | 10 |

TABLE 5

Examples of properties of the TPUs without nucleating agent (2 mm injection-molded plaques that had been heat-treated at 100° C. for 20 h beforehand):

| | Example 8 | Example 9 | Example 10 | Example 11 | Example 12 |
|---|---|---|---|---|---|
| Shore A | 87 | 96 | 91 | — | 96 |
| Shore D | 36 | 47 | — | 53 | 47 |
| Tensile strength [MPa] | 45 | 55 | 55 | 50 | 55 |
| Elongation at break [%] | 600 | 550 | 550 | 450 | 550 |
| Tear propagation resistance [kN/m] | 70 | 120 | 90 | 150 | 120 |
| Compression set (72 h/23° C./30 min) [%] | 25 | 30 | 25 | 40 | 30 |
| Compression set (24 h/70° C./30 min) [%] | 45 | 45 | 40 | 50 | 45 |
| Abrasion [mm$^3$] | 25 | 30 | 30 | 30 | 30 |

1.4 Addition of the Nucleating Agents

The nucleating agent was added either as a masterbatch based on the TPU formulation corresponding to the TPU to which it was ultimately to be added or as a masterbatch based on a TPU with Shore 80 A and an MFR of 20-50 g/10 min (190° C./21.6 kg). A further option is direct addition of the nucleating agent during the extrusion or injection molding or in a separate compounding step. Alternatively, the nucleating agent is added at an early stage during the TPU synthesis.

1.4.1 Addition by Compounding (a) Laboratory Scale:

The TPU pellets are first predried at 80° C. under reduced pressure for 16 hours, then admixed with the additives according to the tables below. The unit "%" here represents "percent by weight" in relation to the polymer specified. The TPU is compounded in the presence of the nucleating agent in the molten state under a nitrogen atmosphere and under high shear. The screw speed was 100 revolutions per minute and the mean residence time was about 3 minutes. One type of apparatus used for this purpose was a laboratory twin-screw extruder having co-rotating screws, such as the micro-compounder (15 cm$^3$) from Xplore Instruments B.V. The force that arises during the compounding was detected constantly. The compounding force at the end of the compounding method (i.e. after 3 minutes) was recorded and serves for estimation of the rheological quality of the melt, or retention of the molecular weight, since there is a correlation between the molecular weight and the compounding force.

Molded articles were subsequently produced by receiving the polymer melt obtained in the micro-compounder in a heated transfer vessel. Then the melt was transferred directly into a 10 cm$^3$ micro-injector (Xplore Instruments B.V.), where the polymer melt was injected into a smooth mold at a pressure of 5 bar and with a mold temperature of 40° C. The injection moldings are round plaques having a diameter of 40 mm and a thickness of 1 mm.

(b) Pilot Scale:

The TPU polymer was predried at 80° C. under reduced pressure for 16 hours and then premixed with the additives. The mixture was added in a twin-screw extruder (Collin GmbH, screw diameter 25 mm, L/D ratio=32, with co-rotating screws) and processed at 210° C. (die temperature), at a screw speed of 120 revolutions per minute. The extruded compound obtained was cooled underwater and pelletized continuously.

Subsequently, the compounded pellets were predried again at 80° C. under reduced pressure for 16 hours, then injection-molded with an Arburg 370S injection-molding machine (closing force 880 kN) at 220° C., and with a mold temperature of 30° C. The injection moldings are plaques of 100 mm×100 mm×2 mm (or 100 mm×100 mm×4 mm as in the examples of table 17).

(c) Characterization

Differential Scanning Calorimetry (DSC):

The DSC instrument was used for analysis of the crystallization characteristics of the various compounds and the reference materials. All measurements were effected under nitrogen atmosphere. The specimens (about 5-10 mg) were tested with the following program: isothermal for 10 minutes at 100° C., then heating to 230° C. at 20° C./min, holding of the temperature of 230° C. (all examples in tables 6, 7, 8, 9 and 10, except for compounding numbers 28, 29 and 30) or 250° C. (compounding numbers 28, 29 and 30) for 3 minutes, then cooling to 30° C. at 20° C./min, then holding for 3 minutes, then heating again to 230° C. at 20° C./min, holding the temperature of 230° C. (all examples except 28, 29 and 30) or 250° C. (examples 28, 29 and 30) for 3 minutes, then cooling to 30° C. at 20° C./min. In tables 12, 13, 15 and 16, testing was effected with the following program: isothermal for 10 minutes at 100° C., then heating to 190° C. at 20° C./min, holding the temperature of 190° C. for 3 minutes, then cooling to 30° C. at 20° C./min, then holding for 3 minutes, then heating again to 230° C. (except in the case of compounds based on example 19 in table 16, where a temperature of 240° C. was taken) at 20° C./min, holding the temperature of 230° C. (except in the case of compounds based on example 19 in table 16, where a temperature of 240° C. was taken) for 3 minutes, then cooling to 30° C. at 20° C./min. The data listed in the further tables are the crystallization temperatures "Tc [° C.]" that correspond to the peak temperatures of the DSC spectra during the second cooling phase.

Determination of Molecular Weight:

The molecular weight was analyzed by GPC. The total molecular weight including the allophanates was listed as solution 10 ("soln. 10") and the molecular weight of the TPU without allophanate as solution 7 ("soln. 7").

Test methods that can be used for the material characterization include the following: DSC, DMA, TMA, NMR, FT-IR, GPC

| | |
|---|---|
| Shore A & D hardness | DIN 7619-1, |
| Tensile strength | DIN 53 504, |
| Elongation at break | DIN 53 504, |
| Tear propagation resistance | DIN 53 515, |
| Abrasion | DIN 4649 |
| Vicat | DIN EN ISO 306 |
| Compression set (CS) | DIN ISO 815 |
| Resilience | DIN standard 53512 |

1.4.2 Addition of the Quinacridone-Based Nucleating Agents

Tables 6 to 10 list the crystallization temperatures that were obtained from the TPU after compounding and heat treatment.

TABLE 6a

Compound list (pilot scale production)

| Feedstocks | Compound number | | | | | | | |
|---|---|---|---|---|---|---|---|---|
| | 1 | 2 | 3 | 4 | 5 | 6 | 7 | 8 |
| Processing method | lab & pilot | lab | lab | lab | lab | pilot | pilot | pilot |
| Example 8 | 100 | 99.95 | | | | 99.95 | 98 | 99.95 |
| Example 9 | | | 100 | 99.95 | 99.95 | | | |
| Nucleating agent 1 | | | | | | | | 0.05 |
| Nucleating agent 2 | | | | | 0.05 | | | |
| Nucleating agent 12 | | | | | | 0.05 | 0.2 | |
| Nucleating agent 15 | | 0.05 | | 0.05 | | | | |
| Tc1 [° C.] | 79.2 | 102.0 | 83.4 | 126.7 | 115.3 | 129.4 | 136.7 | 127.3 |
| Tc2 [° C.] | 79.0 | 99.6 | 82.4 | 126.7 | 113.3 | 127.0 | 135.7 | 125.7 |
| Compounding force [N] | 1370 | 1370 | 1260 | 1260 | 1260 | | | |
| Molecular weight of soln. 10 [kg/mol] | 91 | | | | | 90 | 95 | 93 |
| Molecular weight of soln. 7 [kg/mol] | 82 | | | | | 83 | 86 | 84 |
| Shore A hardness [—] | 89 | | | | | 89 | 89 | 89 |
| Shore D hardness [—] | 40 | | | | | 41 | 40 | 40 |
| Yield stress [MPa] - MD | 42 | | | | | 43 | 44 | 42 |
| Yield stress [MPa] - CD | 42 | | | | | 45 | 45 | 43 |
| Elongation at break [%] - MD | 600 | | | | | 590 | 620 | 600 |
| Elongation at break [%] - CD | 650 | | | | | 620 | 630 | 630 |
| Tear propagation resistance [kN/m] | 74 | | | | | 72 | 73 | 71 |

MD = machine direction,
CD = cross direction

TABLE 6b

Compound list (pilot scale production)

| Feedstocks | Compound number | | | | | | |
|---|---|---|---|---|---|---|---|
| | 9 | 10 | 11 | 12 | 13 | 14 | 15 |
| Processing method | pilot | lab | lab | lab | lab | lab | lab |
| Example 8 | 98 | 99.995 | 99.99 | 99.975 | 99.9 | 99.5 | 99.0 |
| Example 9 | | | | | | | |
| Nucleating agent 1 | 2 | | | | | | |
| Nucleating agent 2 | | 0.005 | 0.01 | 0.025 | 0.1 | 0.5 | 1.0 |
| Nucleating agent 12 | | | | | | | |
| Nucleating agent 15 | | | | | | | |
| Tc1 [° C.] | 129.7 | 80.6 | 79.7 | 78.9 | 107.0 | 111.7 | 115.4 |
| Tc2 [° C.] | 128.7 | 80.0 | 79.3 | 79.3 | 107.6 | 109.0 | 113.4 |
| Compounding force [N] | | 1800 | 1870 | 1780 | 1795 | 1835 | 1875 |
| Molecular weight of soln. 10 [kg/mol] | 92 | | | | | | |
| Molecular weight of soln. 7 [kg/mol] | 85 | | | | | | |
| Shore A hardness [—] | 89 | | | | | | |
| Shore D hardness [—] | 37 | | | | | | |
| Yield stress [MPa] - MD | 45 | | | | | | |
| Yield stress [MPa] - CD | 46 | | | | | | |

TABLE 6b-continued

Compound list (pilot scale production)

| Feedstocks | Compound number | | | | | | |
|---|---|---|---|---|---|---|---|
| | 9 | 10 | 11 | 12 | 13 | 14 | 15 |
| Elongation at break [%] - MD | 610 | | | | | | |
| Elongation at break [%] - CD | 630 | | | | | | |
| Tear propagation resistance [kN/m] | 71 | | | | | | |

MD = machine direction,
CD = cross direction

TABLE 7a

Compound list (laboratory scale production)

| Feedstocks | Compound number | | | | | | |
|---|---|---|---|---|---|---|---|
| | 16 | 17 | 18 | 19 | 20 | 21 | 22 |
| Processing method | lab & pilot | lab | lab | lab | lab | pilot | pilot |
| Example 8 | 99.95 | 99.8 | 99.95 | 99.95 | 99.8 | 99.8 | 99.95 |
| Example 12 | | | | | | | |
| Nucleating agent 2 | | | | | | | |
| Nucleating agent 3 | 0.05 | 0.2 | | | | | |
| Nucleating agent 4 | | | 0.05 | | | | |
| Nucleating agent 5 | | | | 0.05 | | | |
| Nucleating agent 6 | | | | | 0.2 | | |
| Nucleating agent 7 | | | | | | 0.2 | |
| Nucleating agent 8 | | | | | | | 0.05 |
| Nucleating agent 9 | | | | | | | |
| Nucleating agent 10 | | | | | | | |
| Nucleating agent 11 | | | | | | | |
| Nucleating agent 13 | | | | | | | |
| Nucleating agent 14 | | | | | | | |
| Nucleating agent 15 | | | | | | | |
| Additive 1 | | | | | | | |
| Tc1 [° C.] | 116.6 | 109.5 | 117.0 | 108.3 | 103.0 | 104.0 | 119.3 |
| Tc2 [° C.] | 132.7 | 130.1 | 115.0 | 108.0 | 103.0 | 100.3 | 116.7 |
| Molecular weight of soln. 10 [kg/mol] | | | | | | | |
| Molecular weight of soln. 7 [kg/mol] | | | | | | | |

TABLE 7b

Compound list (laboratory scale production)

| Feedstocks | Compound number | | | | | | | |
|---|---|---|---|---|---|---|---|---|
| | 23 | 24 | 25 | 26 | 27 | 28 | 29 | 30 |
| Processing method | pilot | pilot | lab | lab | lab | lab | lab | lab |
| Example 8 | 99.95 | 99.95 | 99.995 | 99.99 | 99.975 | | | |
| Example 12 | | | | | | 100 | 99.95 | 99.95 |
| Nucleating agent 2 | | | | | | | 0.05 | |
| Nucleating agent 3 | | | | | | | | |
| Nucleating agent 4 | | | | | | | | |
| Nucleating agent 5 | | | | | | | | |
| Nucleating agent 6 | | | | | | | | |
| Nucleating agent 7 | | | | | | | | |
| Nucleating agent 8 | | | | | | | | |
| Nucleating agent 9 | 0.05 | | | | | | | |
| Nucleating agent 10 | | 0.05 | | | | | | |
| Nucleating agent 11 | | | 0.05 | | | | | |
| Nucleating agent 13 | | | | 0.05 | | | | |

TABLE 7b-continued

Compound list (laboratory scale production)

| Feedstocks | Compound number | | | | | | | |
|---|---|---|---|---|---|---|---|---|
| | 23 | 24 | 25 | 26 | 27 | 28 | 29 | 30 |
| Nucleating agent 14 | | | | | 0.05 | | | |
| Nucleating agent 15 | | | | | | | | 0.05 |
| Additive 1 | | | | | | | | |
| Tc1 [° C.] | 119.3 | 120.0 | 126.3 | 102.3 | 117.9 | 105 | 157 | 160 |
| Tc2 [° C.] | 117.3 | 119.3 | 126.0 | 77.3 | 114.3 | | | |
| Molecular weight of soln. 10 [kg/mol] | | | | | | 95 | 96 | 96 |
| Molecular weight of soln. 7 [kg/mol] | | | | | | 91 | 90 | 89 |

TABLE 8

Compound list (laboratory scale production)

| Feedstocks | Compound number | | | |
|---|---|---|---|---|
| | 32 | 33 | 34 | 40 |
| Processing method | lab | lab | lab | lab |
| Example 8 | 99.95 | 99.95 | 99.95 | 99.8 |
| Nucleating agent 16 | 0.05 | | | |
| Nucleating agent 17 | | 0.05 | | |
| Nucleating agent 18 | | | 0.05 | |
| Nucleating agent 21 | | | | 0.2 |
| Tc1 [° C.] | 119.0 | 117.9 | 104.3 | 103.3 |
| Tc2 [° C.] | 116.0 | 114.3 | 101.3 | 105.0 |

TABLE 9

Compound list (laboratory scale production)

| Feedstocks | Compound number | | | | |
|---|---|---|---|---|---|
| | 47 | 48 | 49 | 50 | 51 |
| Processing method | lab | lab | lab | lab | lab |
| Example 13 | 100 | 99.95 | 99.8 | 99.95 | 99.8 |
| Nucleating agent 2 | | 0.05 | 0.2 | | |
| Nucleating agent 11 | | | | 0.05 | 0.2 |
| Tc1 [° C.] | 109.8 | 160.5 | 165.0 | 171.5 | 176.2 |
| Tc2 [° C.] | 106.8 | 156.1 | 162.6 | 168.1 | 175.2 |

TABLE 10

Compound list (laboratory scale production)

| Feedstocks | Compound number | | | | | | | | | |
|---|---|---|---|---|---|---|---|---|---|---|
| | 47 | 48 | 49 | 50 | 51 | 52 | 53 | 54 | 55 | 56 |
| Processing method | lab | lab | lab | lab | lab | lab | lab | lab | lab | lab |
| Example 14 | 100 | 99.95 | 99.8 | 99.95 | 99.8 | | | | | |
| Example 15 | | | | | | 100 | 99.95 | 99.8 | 99.95 | 99.8 |
| Nucleating agent 2 | | 0.05 | 0.2 | | | | 0.05 | 0.2 | | |
| Nucleating agent 11 | | | | 0.05 | 0.2 | | | | 0.05 | 0.2 |
| Tc1 [° C.] | 151.9 | 161.5 | 161.9 | 153.1 | 156.5 | 129.1 | 130.1 | 129.7 | 132.0 | 132.5 |
| Tc2 [° C.] | 155.2 | 160.8 | 161.9 | 156.1 | 157.5 | 129.1 | 129.8 | 129.9 | 131.7 | 132.1 |

The mechanical properties of 2 mm TPU injection-molded plaques of TPUs with and without nucleating agents are listed in table 11 (after storage at room temperature after injection molding for 24 hours, pilot scale production).

TABLE 11

Examples of properties of the TPUs with nucleating agents:

| TPU | Example 8 | | | Example 9 | | |
|---|---|---|---|---|---|---|
| Masterbatch | 10% of a masterbatch based on example 6 with or without the respective nucleating agent | | | 10% of a masterbatch based on example 7 with or without the respective nucleating agent | | |
| Nucleating agent | — | Nuc. agent 2 | Nuc. agent 11 | — | Nuc. agent 2 | Nuc. agent 11 |
| Final concentration of the nucleating agent | — | 0.3% | 0.3% | — | 0.3% | 0.3% |
| Density [g/cm$^3$] | 1.12 | 1.12 | 1.121 | 1.214 | 1.215 | 1.216 |
| Shore A | 88 | 89 | 89 | | | |
| Shore D | 38 | 39 | 39 | 47 | 47 | 47 |

TABLE 11-continued

Examples of properties of the TPUs with nucleating agents:

| TPU | Example 8 | | | Example 9 | | |
|---|---|---|---|---|---|---|
| Tensile strength [MPa] | 30 | 31 | 33 | 40 | 42 | 43 |
| Elongation at break [%] | 640 | 640 | 620 | 550 | 550 | 540 |
| Tensile stress at 100% elongation [MPa] | 5.8 | 5.7 | 6 | 7.9 | 7.9 | 7.7 |
| Tear propagation resistance [kN/m] | 58 | 58 | 63 | 83 | 89 | 89 |
| CS (24 h/70° C./30 min) [%] | 71 | 69 | 56 | 73 | 56 | 48 |
| CS (24 h/100° C./30 min) [%] | 89 | 90 | 85 | 95 | 89 | 77 |
| Vicat temperature [° C.] | 86.7 | 90.4 | 96.7 | 103.8 | 108.2 | 115.5 |
| Abrasion [mm³] | 73 | 63 | 60 | 74 | 60 | 76 |

1.4.3 Addition of the Diketopyrrolopyrrole-Based Nucleating Agents

Tables 12 and 13 list the crystallization temperatures that were obtained from the TPU after compounding and heat treatment.

TABLE 12

Compound list (laboratory scale production)

DSC 10 min-100° C., 30° C.-190° C.-30° C., then 30° C.-230° C.-30° C.

| Formulation | First run | | | Second run | | | Fcomp 3' N | Mw solu. 7 kDa | Mw solu. 10 kDa |
|---|---|---|---|---|---|---|---|---|---|
| | Tm (° C.) | Δ Hm (J/g) | Tc (° C.) | Tm (° C.) | Δ Hm (J/g) | Tc (° C.) | | | |
| 100% example 8 | 173.1 | 11.9 | 122.9 | 180.5 | 11.7 | 78.9 | 3785 | 82 | 88 |
| 99.95% example 8 + 0.05% nucleating agent 26 | 165.0 | 13.6 | 121.3 | 179.7 | 11.8 | 116.7 | 3698 | | |
| 99.8% example 8 + 0.2% nucleating agent 26 | 163.4 | 13.1 | 121.0 | 180.4 | 10.3 | 108.6 | 3695 | | |
| 99.95% example 8 + 0.05% nucleating agent 25 | 169.0 | 13.9 | 122.3 | 179.3 | 11.2 | 119.3 | 3688 | | |
| 99.8% example 8 + 0.2% nucleating agent 25 | 164.0 | 13.7 | 126.0 | 179.3 | 11.7 | 127.6 | 3535 | 82 | 87 |
| 99.95% example 8 + 0.05% nucleating agent 27 | 163.3 | 15.0 | 131.0 | 179.0 | 13.1 | 79.9 | | | |
| 99.8% example 8 + 0.2% nucleating agent 27 | 165.6 | 15.3 | 135.0 | 177.6 | 15.1 | 118.7 | | | |
| 99.95% example 8 + 0.05% nucleating agent 28 | 164.3 | 12.7 | 124.4 | 179.2 | 12.1 | 79.7 | | | |
| 99.8% example 8 + 0.2% nucleating agent 28 | 163.0 | 11.4 | 129.6 | 176.3 | 13.5 | 117.7 | | | |
| 99.95% example 8 + 0.05% nucleating agent 29 | 168.2 | 15.7 | 134.7 | 181.5 | 12.6 | 118.4 | 3380 | | |
| 99.8% example 8 + 0.2% nucleating agent 29 | 165.8 | 14.9 | 127.1 | 183.5 | 9.9 | 114.1 | 3303 | | |
| 99.8% example 8 + 0.2% nucleating agent 30 | 167.6 | 13.7 | 119.7 | 164.6 | 11.5 | 80.0 | 3443 | | |
| 99.95% example 8 + 0.025% nucleating agent 29 + 0.025% nucleating agent 30 | 174.9 | 13.9 | 127.4 | 183.2 | 10.5 | 83.0 | 2990 | | |

TABLE 12-continued

Compound list (laboratory scale production)

DSC 10 min-100° C., 30° C.-190° C.-30° C., then 30° C.-230° C.-30° C.

| Formulation | First run Tm (° C.) | First run Δ Hm (J/g) | First run Tc (° C.) | Second run Tm (° C.) | Second run Δ Hm (J/g) | Second run Tc (° C.) | Fcomp 3' N | Mw solu. 7 kDa | Mw solu. 10 kDa |
|---|---|---|---|---|---|---|---|---|---|
| 99.8% example 8 + 0.1% nucleating agent 29 + 0.1% nucleating agent 30 | 164.9 | 14.4 | 128.0 | 182.0 | 11.0 | 125.7 | 3088 | | |
| 99.95% example 8 + 0.05% nucleating agent 31 | 175.2 | 15.8 | 132.4 | 183.5 | 10.4 | 83.4 | 2818 | | |
| 99.8% example 8 + 0.2% nucleating agent 31 | 171.5 | 14.8 | 132.1 | 183.5 | 9.6 | 106.0 | 3028 | | |

TABLE 13

Compound list (laboratory scale production)

DSC 10 min-100° C., 30° C.-190° C.-30° C., then 30° C.-230° C.-30° C., except for example 27: 240° C. rather than 230° C.

| Formulation | 1st run Tm (° C.) | 1st run Δ Hm (J/g) | 1st run Tc (° C.) | 2nd run Tm (° C.) | 2nd run Δ Hm (J/g) | 2nd run Tc (° C.) | Fcomp 3' N | Mw solu. 7 kDa | Mw solu. 10 kDa |
|---|---|---|---|---|---|---|---|---|---|
| 100% example 6 | 174.3 | 1.0 | | 198.9 | 2.3 | 107.8 | 4140 | 64 | 70 |
| 99.95% example 6 + 0.05% nucleating agent 25 | 170.8 | 2.0 | | 198.1 | 2.5 | 168.0 | 3555 | 58 | 61 |
| 99.8% example 6 + 0.2% nucleating agent 25 | 176.5 | 1.8 | | 198.1 | 2.0 | 166.9 | 3063 | 63 | 68 |
| 100% example 26 | 161.9 | 11.2 | 133.7 | 181.9 | 7.6 | 80.3 | 3283 | 63 | 66 |
| 99.95% example 26 + 0.05% nucleating agent 25 | 163.6 | 10.5 | 141.0 | 180.3 | 8.3 | 147.4 | 3078 | 58 | 60 |
| 99.8% example 26 + 0.2% nucleating agent 25 | 167.3 | 12.5 | 141.3 | 180.9 | 10.2 | 149.4 | 2690 | 59 | 61 |
| 100% example 27 | 120.3 | 1.0 | | 203.1 | 12.2 | 169.0 | 1935 | 69 | 74 |
| 99.95% example 27 + 0.05% nucleating agent 25 | 120.0 | 1.0 | | 202.7 | 17.2 | 172.3 | 2170 | | |
| 99.8% example 27 + 0.2% nucleating agent 25 | 119.0 | 1.1 | | 202.4 | 15.9 | 177.3 | 1558 | 62 | 68 |

The mechanical properties of 2 mm TPU injection-molded plaques of TPUs with and without nucleating agents (after storage at room temperature after injection molding for 24 hours, pilot scale production) are listed in table 14.

TABLE 14

Examples of properties of the TPUs with nucleating agents:

| TPU | Example 8 | Example 9 |
|---|---|---|
| Masterbatch | 10% of a masterbatch based on example 8 with or without the respective nucleating agent | 10% of a masterbatch based on example 9 with or without the respective nucleating agent |
| Nucleating agent | — | Nucleating agent 25 | — | Nucleating agent 25 |
| Final concentration of the nucleating agent | — | 0.3% | — | 0.3% |
| Density [g/cm³] | 1.12 | 1.12 | 1.214 | 1.215 |
| Shore A | 88 | 89 | | |
| Shore D | 38 | 39 | 47 | 47 |
| Tensile strength [MPa] | 30 | 31 | 40 | 41 |
| Elongation at break [%] | 640 | 650 | 550 | 530 |

TABLE 14-continued

Examples of properties of the TPUs with nucleating agents:

| TPU | Example 8 | | Example 9 | |
|---|---|---|---|---|
| Tensile stress at 100% elongation [MPa] | 5.8 | 5.8 | 7.9 | 7.8 |
| Tear propagation resistance [kN/m] | 58 | 60 | 83 | 86 |
| CS (24 h/70° C./30 min) [%] | 71 | 69 | 73 | 55 |
| CS (24 h/100° C./30 min) [%] | 89 | 87 | 95 | 84 |
| Vicat temperature [° C.] | 86.7 | 90.9 | 103.8 | 110.8 |
| Abrasion [mm³] | 73 | 76 | 74 | 72 |

1.4.4 Addition of the Nucleating Agents from the Monoazo, Perylene, Phthalocyanine, Isoindoline Classes The mechanical properties of 1 mm TPU injection-molded plaques of TPUs with and without nucleating agents (thickness 1 mm, laboratory scale production) are listed in table 15a.

TABLE 15

Compound list: mini-extruder, injection molding of plaques

DSC: 10 min-100° C., 30° C.-190° C.-30° C., then 30° C.-230° C.-30° C.,

| | | 1st cycle | | | 2nd cycle | | | Fcomp 3' N | Mw solu. 7 kDa | Mw solu. 10 kDa |
|---|---|---|---|---|---|---|---|---|---|---|
| | | Tm (° C.) | Δ Hm (J/g) | Tc (° C.) | Tm (° C.) | Δ Hm (J/g) | Tc (° C.) | | | |
| | 100% example 8 | 173.1 | 11.9 | 122.9 | 180.5 | 11.7 | 78.9 | 3785 | 82 | 88 |
| Comparison 1 | 99% example 8 + 1% talc, fine type, suitable for crystallization, D50 = 2.0 micron | 166.9 | 15.7 | 135.1 | 181.2 | 13.0 | 81.3 | | | |
| Comparison 2 | 98% example 8 + 2% talc, fine type, suitable for crystallization, D50 = 2.0 micron | 169.2 | 14.6 | 132.4 | 179.5 | 12.3 | 81.0 | | | |
| Comparison 3 | 95% example 8 + 5% talc, fine type, suitable for crystallization, D50 = 2.0 micron | 165.3 | 13.2 | 131.7 | 179.3 | 12.3 | 100.3 | | | |
| Comparison 4 | 98% example 8 + 2% talc, fine type, suitable for crystallization, D50 = 2.2 micron | 163.6 | 15.0 | 122.4 | 179.6 | 11.6 | 80.6 | | | |
| Comparison 5 | 95% example 8 + 5% talc, fine type, suitable for crystallization, D50 = 2.2 micron | 169.9 | 16.2 | 125.7 | 179.5 | 12.6 | 101.4 | | | |
| | 99.95% example 8 + 0.05% nucleating agent 32 | 169.7 | 12.4 | 124.3 | 178.0 | 12.6 | 93.9 | 3205 | | |
| | 99.8% example 8 + 0.2% nucleating agent 32 | 162.4 | 12.8 | 123.0 | 179.0 | 7.0 | 114.3 | 3728 | 83 | 87 |
| | 99.95% example 8 + 0.05% nucleating agent 33 | 164.4 | 13.0 | 124.3 | 180.1 | 11.1 | 114.3 | 2853 | 83 | 88 |
| | 99.8% example 8 + 0.2% nucleating agent 33 | 172.3 | 14.4 | 126.6 | 180.0 | 11.7 | 122.7 | 3670 | 82 | 87 |
| | 99.95% example 8 + 0.05% nucleating agent 34 | 159.7 | 15.5 | 121.0 | 178.7 | 12.0 | 126.0 | 3685 | | |
| | 99.8% example 8 + 0.2% nucleating agent 34 | 169.4 | 13.9 | 120.9 | 179.7 | 11.1 | 121.9 | 3755 | 86 | 93 |
| | 99.95% example 8 + 0.05% nucleating agent 35 | 170.3 | 14.3 | 127.3 | 178.0 | 13.0 | 117.7 | 3258 | 79 | 83 |

TABLE 15-continued

Compound list: mini-extruder, injection molding of plaques

DSC: 10 min-100° C., 30° C.-190° C.-30° C., then 30° C.-230° C.-30° C.,

|  | 1st cycle | | | 2nd cycle | | | Fcomp 3' N | Mw solu. 7 kDa | Mw solu. 10 kDa |
| --- | --- | --- | --- | --- | --- | --- | --- | --- | --- |
|  | Tm (° C.) | Δ Hm (J/g) | Tc (° C.) | Tm (° C.) | Δ Hm (J/g) | Tc (° C.) |  |  |  |
| 99.8% example 8 + 0.2% nucleating agent 35 | 174.0 | 14.3 | 122.6 | 180.7 | 11.3 | 106.6 | 3665 | 82 | 88 |
| 99.95% example 8 + 0.05% nucleating agent 36 | 165.7 | 15.2 | 128.7 | 177.7 | 14.4 | 95.9 |  |  |  |
| 99.8% example 8 + 0.2% nucleating agent 36 | 164.6 | 13.3 | 127.4 | 177.6 | 13.2 | 107.4 |  |  |  |
| 99.95% example 8 + 0.05% nucleating agent 37 | 163.9 | 14.4 | 130.7 | 179.9 | 12.5 | 104.7 |  |  |  |
| 99.8% example 8 + 0.2% nucleating agent 37 | 169.4 | 14.4 | 130.9 | 180.4 | 11.5 | 116.6 |  |  |  |
| 99.95% example 8 + 0.05% nucleating agent 38 | 165.0 | 14.8 | 125.0 | 179.3 | 12.4 | 78.9 |  |  |  |
| 99.8% example 8 + 0.2% nucleating agent 38 | 165.2 | 14.0 | 119.7 | 164.9 | 11.8 | 115.3 |  |  |  |

1.4.5 Addition of the Nucleating Agents from the Diketopyrrolopyrrole, Phthalocyanine, Isoindolinone, Monoazo and Perylene Classes in Further TPU Types The mechanical properties of 1 mm TPU injection-molded plaques of TPUs with and without nucleating agents (thickness 1 mm, laboratory scale production) are listed in table 15b and 16.

TABLE 15b

Compound list: mini-extruder

| 99.95% example 8 + 0.05% nucleating agent 41 | 118.1 | 1.3 | 130.6 | 183.7 | 10.6 | 82.6 |
| --- | --- | --- | --- | --- | --- | --- |
| 99.8% example 8 + 0.2% nucleating agent 41 | 117.7 | 1.2 | 136.7 | 181.9 | 10.2 | 129.7 |
| 99.95% example 8 + 0.05% nucleating agent 42 | 119.7 | 1.0 | 138.7 | 182.6 | 13.4 | 88.0 |
| 99.8% example 8 + 0.2% nucleating agent 42 | 117.4 | 1.2 | 139.0 | 182.6 | 12.2 | 85.6 |
| 100% example 9 |  |  | 149.3 | 186.6 | 11.3 | 87.0 |
| 99.95% example 9 + 0.05% nucleating agent 39 |  |  | 149.4 | 187.5 | 11.0 | 87.1 |
| 99.9% example 9 + 0.1% nucleating agent 39 |  |  | 151.7 | 185.6 | 13.2 | 100.6 |
| 99.8% example 9 + 0.2% nucleating agent 39 |  |  | 150.8 | 184.5 | 12.3 | 109.4 |
| 99.95% example 9 + 0.05% nucleating agent 2 |  |  | 143.1 | 184.8 | 10.4 | 134.4 |
| 99.9% example 9 + 0.1% nucleating agent 2 |  |  | 142.1 | 184.5 | 9.9 | 135.8 |
| 99.8% example 9 + 0.2% nucleating agent 2 |  |  | 142.7 | 183.9 | 10.2 | 138.4 |

TABLE 15b-continued

Compound list: mini-extruder

| 99.95% example 9 + 0.05% nucleating agent 15 | 141.8 | 184.5 | 9.9 | 140.1 |
| --- | --- | --- | --- | --- |
| 99.9% example 9 + 0.1% nucleating agent 15 | 139.4 | 185.6 | 10.0 | 140.1 |
| 99.8% example 9 + 0.2% nucleating agent 15 | 142.1 | 185.2 | 10.5 | 143.8 |
| 99.95% example 9 + 0.05% nucleating agent 1 | 142.7 | 184.3 | 11.1 | 140.0 |
| 99.9% example 9 + 0.1% nucleating agent 1 | 140.0 | 185.3 | 10.0 | 141.7 |
| 99.8% example 9 + 0.2% nucleating agent 1 | 144.0 | 186.6 | 9.0 | 138.0 |
| 99.95% example 9 + 0.05% nucleating agent 3 | 142.2 | 184.0 | 8.9 | 141.6 |
| 99.9% example 9 + 0.1% nucleating agent 3 | 143.4 | 186.6 | 9.2 | 135.0 |
| 99.8% example 9 + 0.2% nucleating agent 3 | 144.1 | 187.2 | 11.1 | 136.7 |
| 99.95% example 9 + 0.05% nucleating agent 12 | 142.7 | 186.9 | 10.9 | 148.1 |
| 99.9% example 9 + 0.1% nucleating agent 12 | 146.7 | 187.3 | 10.3 | 148.7 |
| 99.8% example 9 + 0.2% nucleating agent 12 | 148.0 | 187.6 | 11.3 | 149.1 |
| 99.95% example 9 + 0.05% nucleating agent 11 | 146.0 | 185.3 | 11.6 | 150.4 |
| 99.9% example 9 + 0.1% nucleating agent 11 | 148.0 | 187.3 | 11.1 | 147.7 |

TABLE 15b-continued

Compound list: mini-extruder

| | | | | |
|---|---|---|---|---|
| 99.8% example 9 + 0.2% nucleating agent 11 | 147.7 | 187.9 | 11.0 | 150.0 |
| 99.95% example 9 + 0.05% nucleating agent 5 | 141.7 | 185.6 | 10.6 | 118.0 |
| 99.9% example 9 + 0.1% nucleating agent 5 | 142.7 | 186.6 | 10.2 | 122.0 |
| 99.8% example 9 + 0.2% nucleating agent 5 | 143.4 | 184.2 | 9.5 | 133.4 |
| 99.95% example 9 + 0.05% nucleating agent 25 | 145.3 | 187.3 | 9.3 | 142.7 |
| 99.9% example 9 + 0.1% nucleating agent 25 | 146.0 | 185.3 | 9.4 | 151.1 |
| 99.8% example 9 + 0.2% nucleating agent 25 | 148.6 | 185.4 | 11.8 | 152.3 |
| 99.95% example 9 + 0.05% nucleating agent 35 | 148.0 | 185.3 | 11.5 | 119.7 |
| 99.9% example 9 + 0.1% nucleating agent 35 | 148.1 | 185.9 | 9.8 | 120.7 |
| 99.8% example 9 + 0.2% nucleating agent 35 | 148.7 | 187.3 | 11.0 | 119.7 |
| 99.95% example 9 + 0.05% nucleating agent 34 | 139.7 | 186.6 | 7.3 | 133.4 |
| 99.9% example 9 + 0.1% nucleating agent 34 | 140.0 | 186.0 | 8.3 | 134.7 |
| 99.8% example 9 + 0.2% nucleating agent 34 | 145.4 | 186.9 | 8.9 | 136.8 x |

TABLE 16

Compound list: mini-extruder, injection molding of plaques (thickness 1 mm, laboratory scale production)

DSC: 10 min-100° C., 30° C.-190° C.-30° C., then 30° C.-230° C.-30° C., in the case of compounds with example 19: Tmax 240° C. rather than 230° C.

| | | 1st cycle | | | 2nd cycle | | | Fcomp 3' N |
|---|---|---|---|---|---|---|---|---|
| | | Tm (° C.) | ΔHm (J/g) | Tc (° C.) | Tm (° C.) | ΔHm (J/g) | Tc (° C.) | |
| | 100% example 17 | 174.3 | 1.0 | | 198.9 | 2.3 | 107.8 | 4140 |
| Comparison 6 | 99% example 28 + 1% talc, fine type, suitable for crystallization, D50 = 2.2 micron | 178.5 | 1.8 | | 200.5 | 3.0 | 120.5 | 4175 |
| Comparison 7 | 98% example 28 + 2% talc, fine type, suitable for crystallization, D50 = 2.2 micron | 176.2 | 1.4 | | 199.2 | 2.5 | 127.2 | 4315 |
| Comparison 8 | 95% example 28 + 5% talc, fine type, suitable for crystallization, D50 = 2.2 micron | 173.5 | 2.8 | | 198.5 | 1.8 | 143.6 | 3965 |
| | 99.95% example 28 + 0.05% nucleating agent 32 | 175.2 | 1.5 | | 199.1 | 2.5 | 140.0 | 3828 |
| | 99.8% example 28 + 0.2% nucleating agent 32 | 175.0 | 1.8 | | 199.2 | 2.4 | 142.2 | 3548 |
| | 99.95% example 28 + 0.05% nucleating agent 35 | 174.8 | 1.1 | | 198.8 | 2.4 | 137.9 | 3250 |
| | 99.8% example 28 + 0.2% nucleating agent 35 | 172.9 | 0.7 | | 198.2 | 2.0 | 142.2 | 3065 |
| | 100% example 18 | 161.9 | 11.2 | 133.7 | 181.9 | 7.6 | 80.3 | 3283 |
| Comparison 9 | 99% example 26 + 1% talc, fine type, suitable for crystallization, D50 = 2.2 micron | 171.2 | 3.3 | 141.0 | 161.6 | 5.5 | 85.0 | 2870 |

TABLE 16-continued

Compound list: mini-extruder, injection molding of plaques (thickness 1 mm, laboratory scale production)

| | | \multicolumn{3}{c|}{1st cycle} | \multicolumn{3}{c|}{2nd cycle} | |
|---|---|---|---|---|---|---|---|---|
| | | Tm (° C.) | ΔHm (J/g) | Tc (° C.) | Tm (° C.) | ΔHm (J/g) | Tc (° C.) | Fcomp 3' N |
| Comparison 10 | 98% example 26 + 2% talc, fine type, suitable for crystallization, D50 = 2.2 micron | 169.3 | 8.3 | 140.3 | 163.3 | 3.6 | 103.3 | 2888 |
| Comparison 11 | 95% example 26 + 5% talc, fine type, suitable for crystallization, D50 = 2.2 micron | 164.2 | 9.9 | 141.7 | 188.5 | 1.0 | 111.4 | 2963 |
| | 99.95% example 26 + 0.05% nucleating agent 32 | 171.5 | 11.6 | 139.0 | 186.2 | 2.1 | 131.8 | 2315 |
| | 99.8% example 26 + 0.2% nucleating agent 32 | 167.6 | 12.6 | 141.7 | 185.9 | 7.0 | 124.7 | 2720 |
| | 99.95% example 26 + 0.05% nucleating agent 35 | 168.5 | 7.5 | 144.1 | 183.5 | 8.0 | 110.4 | fehlt |
| | 99.8% example 26 + 0.2% nucleating agent 35 | 172.2 | 12.7 | 140.7 | 188.2 | 1.7 | 117.4 | 2533 |
| | 100% example 19 | 120.3 | 1.0 | | 203.1 | 12.2 | 169.0 | 1935 |
| Comparison 12 | 99% example 27 + 1% talc, fine type, suitable for crystallization, D50 = 2.2 micron | 120.0 | 1.0 | | 202.7 | 12.6 | 168.7 | 2210 |
| Comparison 13 | 98% example 27 + 2% talc, fine type, suitable for crystallization, D50 = 2.2 micron | 188.1 | 0.9 | | 201.5 | 12.1 | 173.9 | 2160 |
| Comparison 14 | 95% example 27 + 5% talc, fine type, suitable for crystallization, D50 = 2.2 micron | 119.0 | 1.0 | | 201.7 | 14.2 | 171.6 | 2000 |
| | 99.95% example 27 + 0.05% nucleating agent 32 | 119.7 | 1.1 | | 202.1 | 15.9 | 169.2 | 1850 |
| | 99.8% example 27 + 0.2% nucleating agent 32 | 118.3 | 0.9 | | 202.0 | 15.1 | 171.6 | 1950 |
| | 99.95% example 27 + 0.05% nucleating agent 35 | 119.7 | 1.1 | | 202.7 | 15.9 | 172.0 | 1943 |
| | 99.8% example 27 + 0.2% nucleating agent 35 | 118.0 | 1.0 | | 203.4 | 16.1 | 172.3 | 1805 |

DSC: 10 min-100° C., 30° C.-190° C.-30° C., then 30° C.-230° C.-30° C., in the case of compounds with example 19: Tmax 240° C. rather than 230° C.

Table 17 shows further results. Compounding was conducted in a 25 mm L/D 32 twin-screw extruder. Injection molding was effected in an Arburg 370S (closure force 880 kN). The plaque thickness was 4 mm, pilot scale production.

TABLE 17

Compound list:

| Injection molding temperature [° C.] | | DSC: 10 min-100° C., 30° C.-190° C.-30° C., then 30° C.-230° C.-30° C., | | | | | |
|---|---|---|---|---|---|---|---|
| | | 1st cycle | | | 2nd cycle | | |
| | | Tm (° C.) | Δ Hm (J/g) | Tc (° C.) | Tm (° C.) | Δ Hm (J/g) | Tc (° C.) |
| 190 | 100% example 8 | 170.5 | 5.4 | 124.0 | 167.8 | 10.7 | 82.6 |
| 225 | 100% example 8 | 167.3 | 12.4 | 128.3 | 166.3 | 13.3 | 84.0 |
| 190 | 99.95% example 8 + 0.05% nucleating agent 33 | 168.0 | 11.7 | 125.9 | 166.4 | 13.0 | 117.3 |
| 225 | 99.95% example 8 + 0.05% nucleating agent 33 | 168.3 | 10.9 | 127.6 | 183.0 | 13.2 | 118.6 |
| 190 | 99.8% example 8 + 0.2% nucleating agent 33 | 179.0 | 11.9 | 127.0 | 183.3 | 13.3 | 121.6 |
| 225 | 99.8% example 8 + 0.2% nucleating agent 33 | 170.6 | 12.7 | 129.0 | 184.0 | 13.3 | 122.0 |
| 190 | 99.95% example 8 + 0.05% nucleating agent 34 | 172.0 | 11.1 | 123.6 | 166.4 | 11.4 | 121.3 |
| 225 | 99.95% example 8 + 0.05% nucleating agent 34 | 165.7 | 9.9 | 128.6 | 184.0 | 12.5 | 124.6 |
| 190 | 99.8% example 8 + 0.2% nucleating agent 34 | 172.8 | 9.3 | 123.3 | 166.8 | 8.4 | 125.3 |
| 225 | 99.8% example 8 + 0.2% nucleating agent 34 | 168.0 | 11.4 | 126.0 | 167.6 | 12.9 | 127.0 |

1.5 Determination of the Cycle Times

The comparison of the total cycle times is conducted in a DEMAG ergotech 200/500-610 injection molding machine with a Ø 40 mm three-zone screw. As injection molding 1, a cylinder (outside Ø 80 mm, depth 40 mm) with a wall thickness of 8 mm is produced in a split mold. Injection is effected here via an open hot-runner die into an 8-fold cold-runner star distributor. As injection molding 2, a disk (Ø 125 mm, thickness 27 mm) is produced in a split mold. Injection is effected here via a central cold-runner sprue gate. Demolding is effected by means of a ring ejector, which strips the shell off from the core present in the cavity for demolding. A force sensor present in the ejector system transmits the force required to strip off the shell.

The pellets are dried at 90° C. for 3 h. The processing temperatures of the various screw zones are between 195° C. and 230° C. The nucleating agent is added as a masterbatch. The final concentration of the nucleating agent in the TPU is 0.3%.

The masterbatch was obtained by incorporating the nucleating agent by compounding to give a TPU having Shore 80 A and an MFR of 20-50 g/10 min (190° C./21.6 kg) in a twin-screw extruder (co-rotating screws) with screw diameter 16 mm and a length/diameter ratio of 44.

TABLE 18

| Injection molding parameters | | | | | | | |
|---|---|---|---|---|---|---|---|
| | | | | | Mold temperature [° C.] | | |
| | | | | Cooling | | | Demolding |
| TPU | Injection molding | Nucleating agent | Cycle time [s] | time [s] | Injection side | Closure side | force [N] |
| Example 8 | 1 | — | 200 | 130 | 75 | 70 | 1900 |
| Example 8 | 1 | 0.3% nucleating agent 2 | 155 | 85 | 75 | 70 | 1500 |
| Example 8 | 1 | 0.3% nucleating agent 2 + 0.2% demolding aid 1 | 150 | 75 | 75 | 70 | 300 |

TABLE 18-continued

| | | | Injection molding parameters | | | | |
|---|---|---|---|---|---|---|---|
| | | | | Cooling | Mold temperature [° C.] | | Demolding |
| TPU | Injection molding | Nucleating agent | Cycle time [s] | time [s] | Injection side | Closure side | force [N] |
| Example 8 | 1 | 0.3% nucleating agent 25 | 170 | 100 | 75 | 70 | 3700 |
| Example 10 | 1 | — | 119 | 75 | 75 | 70 | 300 |
| Example 10 | 1 | 0.3% nucleating agent 2 | 89 | 45 | 75 | 70 | 300 |
| Example 11 | 1 | — | 194 | 140 | 75 | 70 | 5000 |
| Example 11 | 1 | 0.3% nucleating agent 2 | 158 | 105 | 75 | 70 | 3000 |
| Example 29 | 1 | — | 197 | 150 | 24 | 40 | — |
| Example 29 | 1 | 1% demolding aid 2 | 127 | 80 | 24 | 40 | — |
| Example 29 | 1 | 1% demolding aid 2 + 0.3% nucleating agent 12 | 87 | 40 | 24 | 40 | — |
| Example 30 | 1 | — | 315 | 260 | 24 | 40 | — |
| Example 30 | 1 | 1% demolding aid 2 | 265 | 200 | 24 | 40 | — |
| Example 30 | 1 | 1% demolding aid 2 + 0.3% nucleating agent 12 | 205 | 150 | 24 | 40 | — |
| Example 31 | 2 | — | 314 | 230 | 35 | 35 | — |
| Example 31 | 2 | 0.5% demolding aid 1 + 0.5% demolding aid 2 | 304 | 220 | 35 | 35 | — |
| Example 31 | 2 | 0.3% nucleating agent 12 | 294 | 210 | 35 | 35 | — |
| Example 31 | 2 | 0.5% demolding aid 1, 0.5% demolding aid 2, 0.3% nucleating agent 12 | 274 | 190 | 35 | 35 | — |

The mechanical properties of 2 mm TPU injection-molded plaques of TPUs with and without nucleating agents are listed in table 19a. Table 19a shows the positive interaction of the claimed nucleating agents with co-additives such as carbon black and demolding agents.

TABLE 19a

Examples of properties of the TPUs with nucleating agents (after storage at room temperature for 24 hours after injection molding):

| TPU | Example 8 | | Example 9 | |
|---|---|---|---|---|
| Masterbatch | 10% of a masterbatch based on example 8 with or without the respective nucleating agent | | 10% of a masterbatch based on example 9 with or without the respective nucleating agent | |
| Nucleating agent | — | Nucleating agent 25 | — | Nucleating agent 25 |
| Final concentration of the nucleating agent | — | 0.3% | — | 0.3% |
| Density [g/cm$^3$] | 1.12 | 1.12 | 1.214 | 1.215 |
| Shore A | 88 | 89 | | |
| Shore D | 38 | 39 | 47 | 47 |
| Tensile strength [MPa] | 30 | 31 | 40 | 41 |
| Elongation at break [%] | 640 | 650 | 550 | 530 |
| Tensile stress at 100% elongation [MPa] | 5.8 | 5.8 | 7.9 | 7.8 |

TABLE 19a-continued

Examples of properties of the TPUs with nucleating agents (after storage at room temperature for 24 hours after injection molding):

| TPU | Example 8 | | Example 9 | |
|---|---|---|---|---|
| Tear propagation resistance [kN/m] | 58 | 60 | 83 | 86 |
| CS (24 h/70° C./30 min) [%] | 71 | 69 | 73 | 55 |
| CS (24 h/100° C./30 min) [%] | 89 | 87 | 95 | 84 |
| Vicat temperature [° C.] | 86.7 | 90.9 | 103.8 | 110.8 |
| Abrasion [mm$^3$] | 73 | 76 | 74 | 72 |

In addition, experiments were conducted by the same production method as described above, but with further co-additives, in masterbatch form according to these formulations:

Feedstocks:

Carbon black with iodine number 88-96 mg/g and residue on 325 mesh screen (mesh size 0.044 mm, according to ASTM D 1514)<30 ppm Co-additive 1 15% carbon black+10% demolding agent 2 in TPU Ca stearate with CaO content 8-11%, bulk density 170-220 g/L.

TABLE 19b

| TPU | Injection molding | Additives | Cycle time [s] | Cooling time [s] | Mold temperature [° C.] Injection side | Mold temperature [° C.] Closure side | Demolding force [N] |
|---|---|---|---|---|---|---|---|
| Example 29 | 2 | — | 214 | 140 | — | — | — |
| Example 29 | 2 | 1% demolding aid 2, 10% co-additive 1 | 146 | 70 | — | — | — |
| Example 29 | 2 | 0.2% demolding agent 2, 0.3% carbon black, 0.3% nucleating agent 12 | 111 | 35 | — | — | — |
| Example 30 | 2 | — | 324 | 270 | — | — | — |
| Example 30 | 2 | 1% demolding aid 2 | 284 | 200 | — | — | — |
| Example 30 | 2 | 1% demolding aid 2, 10% co-additive 1 | 236 | 150 | — | — | — |
| Example 30 | 2 | 0.2% demolding agent 2, 0.3% carbon black, 0.3% nucleating agent 12 | 217 | 130 | — | — | — |
| Example 30 | 2 | 0.2% demolding agent 2, 0.3% carbon black, 0.3% nucleating agent 12, 0.03% Ca stearate | 212 | 125 | — | — | — |

2. Cast Elastomer Production Examples

All components including the catalyst and nucleating agent (A component) apart from the isocyanate were combined and homogenized by mixing at 1200 rpm with a Speedmixer for 2 min and then heated to 50° C. Thereafter, the isocyanate (B component) which had first been heated to 50° C., and to 80° C. in the case of isocyanate 6, was added to the A component. The reaction mixture was then stirred at 1700-1950 rpm with a Speedmixer for 30 s and then transferred rapidly and evenly into a mold at 90-100° C. and flattened with the aid of a wooden splint. The mold had different thicknesses: 2, 6 and 10 mm.

After curing, the test specimens were promptly subjected to heat treatment on a Teflon film in a heating cabinet at 90° C. for 24 h.

TABLE 20

| Synthesis examples: | | | | | | | |
|---|---|---|---|---|---|---|---|
| | Example 20 | Example 21 | Example 22 | Example 23 | Example 24 | Example 25 | Example 26 |
| Polyol 1 [g] | | 25.93 | 25.74 | | | 25.97 | 25.84 |
| Polyol 7 [g] | 49.38 | 25.92 | 25.73 | | | 25.96 | 25.83 |
| Polyol 8 [g] | | | | 55.9 | 55.62 | | |
| Isocyanate 4 [g] | 39.98 | | | | | | |
| Isocyanate 5 [g] | | 38.65 | 38.65 | 36.26 | 36.26 | 39.22 | 39.03 |
| CE 2 [g] | 10.65 | 5.7 | 5.66 | 6.06 | 6.03 | 5.71 | 5.68 |
| Catalyst 3 [g] | | | | 0.05 | 0.05 | 0.07 | 0.07 |
| Additive 3 [g] | | 0.61 | 0.61 | | | | |
| Additive 4 [g] | | 2.45 | 2.43 | 1.73 | | 2.46 | 2.44 |
| Catalyst 4 [g] | | 0.07 | 0.07 | | | | |
| Additive 2 [g] | | 0.61 | 0.61 | | | 0.61 | 0.61 |
| Nucleating agent 15 | | 0.05 | 0.5 | | | | |
| Nucleating agent 25 | | | | | | 0.5 | 0.5 |
| Index | 1000 | 1010 | 1010 | 1020 | 1020 | 1020 | 1020 |

TABLE 21

| Mechanical properties of the examples | | | | | | | |
|---|---|---|---|---|---|---|---|
| | Example 20 | Example 21 | Example 22 | Example 23 | Example 24 | Example 25 | Example 26 |
| Resilience [%] | 32 | 39 | 43 | 28 | 35 | 27 | 39 |
| Shore A hardness | 83 | 83 | 84 | 81 | 86 | 83 | 81 |
| Tensile strength [MPa] | 33 | 37 | 39 | 56 | 52 | 45 | 44 |
| Elongation at break [%] | 400 | 430 | 440 | 540 | 540 | 430 | 430 |
| Tear propagation resistance [kN/m] | 26 | 22 | 29 | 35 | 43 | 21 | 21 |
| CS 72 h/23° C./30 min [%] | 15 | 18 | 16 | 13 | 19 | 14 | 17 |
| CS 24 h/70° C./30 min [%] | 31 | 27 | 25 | 19 | 24 | 21 | 22 |
| CS 24 h/80° C./30 min [%] | 32 | 27 | 27 | 22 | 27 | 22 | 20 |

3. Methods of Measurement

Test methods that can be used for the material characterization include the following: DSC, DMA, TMA, NMR, FT-IR, GPC

| | |
|---|---|
| Shore A & D hardness | DIN 7619-1, |
| Tensile strength | DIN 53 504, |
| Elongation at break | DIN 53 504, |
| Tear propagation resistance | DIN 53 515, |
| Abrasion | DIN 4649 |
| Vicat | DIN EN ISO 306 |
| Compression set (CS) | DIN ISO 815 |

4. Tests in a Specific Cast Elastomer 100 g of a prepolymer that had been preheated to 80° C., obtained from 37.42% isocyanate 1, 41.67% polyol 7 and 20.91% polyol 1, were introduced together with 7.62 g of a mixture, preheated to 40° C., of nucleating agent 25 (0.25% or 0.5%), chain extender 2 and 0.6 g of catalyst 5 into a casting mold at 120° C. The material was demolded after 30 minutes and heat-treated at 110° C. for 16 hours.

The flat test specimens thus obtained were then diecut and tested in accordance with ASTM D790 (bending test) and ASTM D412 (tensile test).

TABLE 22

| | Blank | 0.25% nucleating agent 25 | 0.5% nucleating agent 25 |
|---|---|---|---|
| Flexural modulus [MPa] | 59.0 | 135.4 | 157.7 |
| Flexural strength [MPa] | 4.1 | 9.2 | 10.4 |
| Tensile strength at 10% elongation [MPa] | 3.1 | 6.4 | 6.6 |
| Tensile strength at 100% elongation [MPa] | 8.1 | 9.4 | 9.6 |
| Tensile strength at 300% elongation [MPa] | 14.2 | 13.7 | 14.3 |
| Elongation at break [%] | 3.6 | 3.5 | 3.3 |

5. Comparative Experiments (a) Comparative Examples in Polybutylene Succinate
Data for polybutylene succinate utilized:
Density: 1.25 g/cm³
Melting temperature: 114° C.+/−3° C.
Determination of Tc1 and Tc2:
DSC program: two cycles 30° C.–200° C. (3 min at 200° C.)–30° C., heating and cooling rates 10 K/min, under nitrogen. Tc1 is the temperature peak in the first cooling and Tc2 in the second cooling.

Compounds were produced with polybutylene succinate. The results of the experiments are summarized in tables 23a and 23b.

TABLE 23a

| | Compound number | | | | | | | | | | | | |
|---|---|---|---|---|---|---|---|---|---|---|---|---|---|
| Feedstocks | PBS | PBS1 | PBS2 | PBS3 | PBS4 | PBS5 | PBS6 | PBS7 | PBS8 | PBS9 | PBS-10 | PBS-11 | PBS-12 |
| Processing method | lab | lab | lab | lab | lab | lab | lab | lab | lab | lab | lab | lab | lab |
| Polybutylene succinate | 100 | 99.95 | 99.8 | 99.95 | 99.8 | 99.95 | 99.8 | 99.95 | 99.8 | 99.95 | 99.8 | 99.95 | 99.8 |
| Nucleating agent 39 | | 0.05 | 0.2 | | | | | | | | | | |
| Nucleating agent 40 | | | | 0.05 | 0.2 | | | | | | | | |
| Nucleating agent 2 | | | | | | 0.05 | 0.2 | | | | | | |
| Nucleating agent 1 | | | | | | | | 0.05 | 0.2 | | | | |
| Nucleating agent 3 | | | | | | | | | | 0.05 | 0.2 | | |
| Nucleating agent 19 | | | | | | | | | | | | 0.05 | 0.2 |
| Nucleating agent 25 | | | | | | | | | | | | | |
| Tc1 [° C.] | 87.4 | 86.1 | 88.9 | 87.2 | 87.0 | 84.8 | 85.5 | 86.9 | 87.1 | 87.0 | 86.1 | 85.8 | 86.6 |
| Tc2 [° C.] | 85.0 | 84.2 | 88.6 | 84.7 | 84.6 | 81.7 | 79.4 | 85.5 | 85.6 | 85.5 | 83.5 | 83.4 | 80.6 |

TABLE 23b

| | Compound number | | | | | | | | | |
|---|---|---|---|---|---|---|---|---|---|---|
| Feedstocks | PBS-13 | PBS-14 | PBS-15 | PBS-16 | PBS-17 | PBS-18 | PBS-19 | PBS-20 | PBS-21 | PBS-22 |
| Processing method | lab | lab | lab | lab | lab | lab | lab | lab | lab | lab |
| Polybutylene succinate | 99.95 | 99.8 | 99.95 | 99.8 | 99.95 | 99.8 | 99.95 | 99.8 | 99.95 | 99.8 |
| Nucleating agent 25 | 0.05 | 0.2 | | | | | | | | |

TABLE 23b-continued

| Feedstocks | PBS-13 | PBS-14 | PBS-15 | PBS-16 | PBS-17 | PBS-18 | PBS-19 | PBS-20 | PBS-21 | PBS-22 |
|---|---|---|---|---|---|---|---|---|---|---|
| Nucleating agent 31 | | | 0.05 | 0.2 | | | | | | |
| Nucleating agent 29 | | | | | 0.05 | 0.2 | | | | |
| Nucleating agent 35 | | | | | | | 0.05 | 0.2 | | |
| Nucleating agent 34 | | | | | | | | | 0.05 | 0.2 |
| Tc1 [° C.] | 85.6 | 86.4 | 87.9 | 86.1 | 87.6 | 85.8 | 87.5 | 87.9 | 87.1 | 86.6 |
| Tc2 [° C.] | 83.7 | 84.5 | 85.5 | 84.1 | 85.9 | 83.3 | 85.7 | 85.7 | 83.9 | 84.8 | n.c. = no crystallization peak apparent in the DSC spectrum

These results show that none of the compounds claimed at all are effective in polybutylene succinate. Therefore, the person skilled in the art was in no way able to conclude from such data that these compounds could be active in TPU.

(b) Comparative Examples in Polylactic Acid

Data for polylactic acid utilized:
Density: 1.24 g/cm$^3$
Melting temperature: 170° C.+/−1° C.
Melt flow index (190° C., 2.16 kg): 35 dg/min
Suitable for injection molding applications
PDLA content: about 1.5%

Determination of Tc1 and Tc2:
DSC program: two cycles 30° C.–230° C. (3 min at 230° C.)–30° C., heating and cooling rates 10 K/min, under nitrogen. Tc1 is the temperature peak in the first cooling and Tc2 in the second cooling.

Compounds were produced with polylactic acid. The results of the experiments are summarized in tables 24a and 24b.

TABLE 24a

| Feedstocks | PL | PL1 | PL2 | PL3 | PL4 | P5L | PL6 | PL7 | PL8 | PL9 | PL-10 | PL-11 |
|---|---|---|---|---|---|---|---|---|---|---|---|---|
| Processing method | lab | lab | lab | lab | lab | lab | lab | lab | lab | lab | lab | lab |
| Polylactic acid | 100 | 99.95 | 99.8 | 99.95 | 99.8 | 99.95 | 99.8 | 99.95 | 99.8 | 99.95 | 99.8 | 99.95 |
| Nucleating agent 39 | | 0.05 | 0.2 | | | | | | | | | |
| Nucleating agent 40 | | | | 0.05 | 0.2 | | | | | | | |
| Nucleating agent 2 | | | | | | 0.05 | 0.2 | | | | | |
| Nucleating agent 1 | | | | | | | | 0.05 | 0.2 | | | |
| Nucleating agent 3 | | | | | | | | | | 0.05 | 0.2 | |
| Nucleating agent 19 | | | | | | | | | | | | 0.05 |
| Tc1 [° C.] | n.c. | 135.9 | 138.6 | 116.3 | 97.3 | 108.6 | 110.6 | 101.9 | 98.3 | 95.1 | 92.9 | 90.9 |
| Tc2 [° C.] | n.c. | 135.7 | 138.6 | 115.6 | 95.6 | 110.2 | 110.3 | 102.1 | 101.1 | 95.1 | 93.1 | 91.6 |

TABLE 24b

| Feedstocks | PL-12 | PL-13 | PL-14 | PL-15 | PL-16 | PL-17 | PL-18 | PL-19 | PL-20 | PL-21 | PL-22 |
|---|---|---|---|---|---|---|---|---|---|---|---|
| Processing method | lab | lab | lab | lab | lab | lab | lab | lab | lab | lab | lab |
| Polylactic acid | 99.8 | 99.95 | 99.8 | 99.95 | 99.8 | 99.95 | 99.8 | 99.95 | 99.8 | 99.95 | 99.8 |
| Nucleating agent 19 | 0.2 | | | | | | | | | | |
| Nucleating agent 25 | | 0.05 | 0.2 | | | | | | | | |
| Nucleating agent 31 | | | | 0.05 | 0.2 | | | | | | |
| Nucleating agent 29 | | | | | | 0.05 | 0.2 | | | | |

TABLE 24b-continued

| Feedstocks | Compound number | | | | | | | | | | |
|---|---|---|---|---|---|---|---|---|---|---|---|
| | PL-12 | PL-13 | PL-14 | PL-15 | PL-16 | PL-17 | PL-18 | PL-19 | PL-20 | PL-21 | PL-22 |
| Nucleating agent 35 | | | | | | | | 0.05 | 0.2 | | |
| Nucleating agent 34 | | | | | | | | | | 0.05 | 0.2 |
| Tc1 [° C.] | 94.7 | 95.0 | 99.7 | 119.8 | 121.2 | 132.6 | 134.2 | 135.1 | 137.9 | n.c. | n.c. |
| Tc2 [° C.] | 96.8 | 99.0 | 100.0 | 121.4 | 121.2 | 132.8 | 134.5 | 135.3 | 138.7 | n.c. | n.c. | n.c. = no crystallization peak apparent in the DSC spectrum

These results show that some but not all compounds claimed are also effective in polylactic acid. Therefore, the person skilled in the art was not able to conclude from such data that these compounds would also be active in TPU.

(c) Comparative Examples in Nylon-6

Figures for nylon-6 utilized:
Density: 1.13 g/cm³
Melting temperature: 170° C.+/−1° C.
Melt flow index (175° C., 5 kg): 130 dg/min (on dried specimen)
Determination of Tc1 and Tc2:
DSC program: two cycles 30° C.–280° C. (3 min at 280° C.)–30° C., heating and cooling rates 20 K/min, under nitrogen. Tc1 is the temperature peak in the first cooling and Tc2 in the second cooling.

Compounds were produced with nylon-6. The results of the experiments are summarized in table 25.

TABLE 25

| Feedstocks | Compound number | | | | | |
|---|---|---|---|---|---|---|
| | PA | PA1 | PA2 | PA3 | PA4 | PA5 |
| Processing | lab | lab | lab | lab | lab | lab |

TABLE 25-continued

| Feedstocks | Compound number | | | | | |
|---|---|---|---|---|---|---|
| | PA | PA1 | PA2 | PA3 | PA4 | PA5 |
| method | | | | | | |
| Nylon-6 | 100 | 99.95 | 99.8 | 99.95 | 99.8 | 99.8 |
| Nucleating agent 39 | | 0.05 | 0.2 | | | |
| Nucleating agent 40 | | | | 0.05 | 0.2 | |
| Talc | | | | | | 0.2 |
| Tc1 [° C.] | 181.8 | 180.8 | 180.0 | 188.3 | 188.0 | 188.1 |
| Tc2 [° C.] | 181.1 | 180.1 | 179.0 | 187.3 | 187.3 | 187.8 |

These results show that the tested compounds are slightly effective in polyamide, but no more than talc. Therefore, the person skilled in the art was not able to conclude from these data that these compounds would also be particularly active in TPU.

(d) Comparative Examples of Commercial Nucleating Agents in Example 8

Compounds were produced analogously to example 8, using commercial nucleating agents. The results of the experiments are summarized in table 26.

Tc1 was not measured, just Tc2 (after Tmax=230° C.).

TABLE 26

| Feedstocks | Compound number | | | | | | | | |
|---|---|---|---|---|---|---|---|---|---|
| | T-1 | T-2 | T-3 | T-4 | T-5 | T-6 | T-7 | T-8 | |
| Processing method | lab | lab | lab | lab | lab | lab | lab | lab | lab |
| Example 8 | 100 | 99.9 | 99.8 | 99.5 | 98 | 95 | 99.5 | 99.5 | 99.5 |
| Talc, fine type, suitable for crystallization, with D50 = 2.2 micron | | 0.1 | 0.2 | 0.5 | 2 | 5 | | | |
| Reaction mixture of sodium salt of montanic acids and montan wax and montanic acids (Licomont NAV 101) | | | | | | | 0.5 | | |
| 1,3:2,4-bis(3,4-dimethylbenzylidene)-sorbitol (Millad 3988) | | | | | | | | 0.5 | |
| Mixture with 2,2′-methylenebis(2,4-di-tert-butylphenyl) phosphate lithium salt as main constituent (ADK-Stab NA-71) | | | | | | | | | 0.5 |
| Tc2 [° C.] | 79.7 | 78.3 | 78.6 | 78.9 | 80.6 | 101.4 | n.c. | 76.3 | n.c. | n.c. = no crystallization peak apparent in the DSC spectrum (e) Comparative Examples of Commercial Nucleating Agents in Example 11

Compounds were produced analogously to example 11, using commercial nucleating agents. The results of the experiments are summarized in table 27. The additives were incorporated in a laboratory extruder.

DSC: 20 K/min in heating and cooling run, Tmax 250° C., time at Tmax=2 min

TABLE 27

| Feedstocks | Compound number | | | | | | |
|---|---|---|---|---|---|---|---|
| | T-9 | T-10 | T-11 | T-12 | T-13 | T-14 | |
| Processing method | lab | lab | lab | lab | lab | lab | lab |
| Example 11 | 100 | 99.7 | 99.7 | 99.7 | 99.5 | 99.5 | 99.5 |
| 2,2'-Methylenebis(4,6-di-t-butylphenyl) phosphate, sodium salt (Irgastab NA11) | | 0.3 | | | | | |
| Zinc glycerolate (Irgastab NA287) | | | 0.3 | | | | |
| 1,3,5-tris[2,2-dimethyl-propionylamino]benzene (Irgaclear XT386) | | | | 0.3 | | | |
| Ultrafine, surface-treated calcium carbonate (Socal 312) | | | | | 0.5 | | |
| Acrylonitrile-butadiene-styrene copolymer with high butadiene content (Elix 152 I) | | | | | | 0.5 | |
| Hydrophobic silica-kaolinite mixture modified with an alkylsilane (Aktisil PF777) | | | | | | | 0.5 |
| Tc [° C.] | 84 | 88 | 106 | 95 | 93 | 78 | 88 |

(f) Comparative Examples of Commercial Nucleating Agents in Example 12

Compounds were produced analogously to example 12, using commercial nucleating agents. The results of the experiments are summarized in table 28. The additives were incorporated in a laboratory extruder.

DSC: 20 K/min in heating and cooling run. Tmax 250° C., time at Tmax=2 min

TABLE 28

| Feedstocks | Compound number | | | | | | |
|---|---|---|---|---|---|---|---|
| | T-15 | T-16 | T-17 | T-18 | T-19 | T-20 | |
| Processing method | lab | lab | lab | lab | lab | lab | lab |
| Example 12 | 100 | 99.7 | 99.7 | 99.7 | 99.5 | 99.5 | 99.5 |
| 2,2'-Methylenebis(4,6-di-t-butylphenyl) phosphate, sodium salt (Irgastab NA11) | | 0.3 | | | | | |
| Zinc glycerolate (Irgastab NA287) | | | 0.3 | | | | |
| 1,3,5-tris[2,2-dimethyl-propionylamino]benzene (Irgaclear XT386) | | | | 0.3 | | | |
| Ultrafine, surface-treated calcium carbonate (Socal 312) | | | | | 0.5 | | |
| Acrylonitrile-butadiene-styrene copolymer with high butadiene content (Elix 152 I) | | | | | | 0.5 | |
| Hydrophobic silica-kaolinite mixture modified with an alkylsilane (Aktisil PF777) | | | | | | | 0.5 |
| Tc [° C.] | 106 | 104 | 100 | 104 | 103 | 105 | 107 |

These results show that the typical commercial nucleating agents are not active at all in TPU example 8, or even have an adverse interaction on the morphology and on the crystallization kinetics of TPU from example 8. Therefore, the person skilled in the art was not able to conclude from these data that these compounds would also be particularly active in TPU.

It is even more astonishing that the compounds claimed in this invention are known effective nucleating agents in polypropylene, as reported, for example, in Journ. Of Pol. Sci. Part B: Pol. Phys., 40, 2002, 2504-2515 for quinacridones, or Journ. Appl. Polym. Sci., 90, 2003, 3957-3964, for phthalocyanines, or patent U.S. Pat. No. 6,995,202 (filing date Jul. 11, 2003) for the warpage characteristics of diketopyrrolopyrrole (indeed, warpage is a side-effect of crystallization), or patent U.S. Pat. No. 9,029,446 (filing date Jul. 12, 2009) with regard to phthalocyanines, quinacridones, perylenes, dioxazines, isoindolinones, isoindolines and diketopyrrolopyrrole (admittedly together with trisamide in this patent).

It is therefore very astonishing that compounds that are very active in a nonpolar polymer such as polypropylene are then entirely inactive in a polar polymer such as polybutylene succinate, and those that are only partly active in other polar polymers such as polylactic acid or polyamide show such a high crystallizing effect in a polar polymer such as TPU.

The invention claimed is:

1. A process for producing a composition (I) comprising a compact polyurethane (P1), the process comprising:
   (i) adding at least one compound (N) that has a conjugated, nitrogen-containing aromatic structure as a nucleating agent to a polyurethane (P1) or to a reaction mixture for production of a compact polyurethane (R-P1), wherein the compound (N) is a solid; and
   (ii) mixing the nucleating agent and the polyurethane (P1) or the reaction mixture (R-P1) to obtain a composition (I),
   wherein a total amount of nucleating agents used is in a range from 0.01% by weight to 2.0% by weight, based on the polyurethane (P1) or the reaction mixture (R-P1),
   wherein the nucleating agent is at least one compound selected from the group consisting of a quinacridone, a monoazo compound, a perylene, a diketopyrrolopyrrole, an isoindoline, a phthalocyanine, and a derivative of one of these compounds.

2. The process according to claim 1, wherein the compact polyurethane is a compact thermoplastic polyurethane.

3. The process according to claim 1, further comprising (iii) and (iv):
   (iii) heating the composition (I) to a temperature in a region of a melting range of a thermoplastic polyurethane (P1) with at least partial melting of the thermoplastic polyurethane (P1); and
   (iv) cooling the composition.

4. The process according to claim 3, wherein the composition (I) in (iii) is heated to a temperature in the region of the melting temperature of a hard phase or above the melting temperature of the hard phase of the thermoplastic polyurethane (P1).

5. The process according to claim 1, wherein the total amount of the nucleating agents used is in a range from 0.04% by weight to 0.3% by weight, based on the polyurethane (P1) or the reaction mixture (R-P1).

6. The process according to claim 1, wherein the nucleating agent is at least one compound selected from the group consisting of a quinacridone, a diketopyrrolopyrrole, a phthalocyanine, and a derivative of one of these compounds.

7. The process according to claim 1, wherein the nucleating agent has been subjected to:
   a treatment comprising grinding;
   a treatment with a solvent, acid, alkali, bleach, crystallization or extraction;
   a finishing operation to reduce or prevent flocculation or lump formation;
   a finishing operation to control particle size; or
   a finishing operation to regulate viscosity.

8. The process according to claim 1, wherein the nucleating agent is used in solid form with a specific surface area in a range from 10 $m^2/g$ to 150 $m^2/g$.

9. The process according to claim 1, wherein the nucleating agent is used in combination with a further additive.

10. The process according to claim 9, wherein the further additive is at least one selected from the group consisting of carbon black and a wax-based demolding agent.

* * * * *